(12) United States Patent
Arditti Ilitzky et al.

(10) Patent No.: US 11,916,800 B2
(45) Date of Patent: Feb. 27, 2024

(54) DYNAMIC VIRTUAL CUT-THROUGH AND DYNAMIC FABRIC BANDWIDTH ALLOCATION BETWEEN VIRTUAL CUT-THROUGH AND STORE-AND-FORWARD TRAFFIC

(71) Applicant: Intel Corporation, Santa Clara, CA (US)

(72) Inventors: David Arditti Ilitzky, Zapopan (MX); John Greth, Hudson, MA (US); Robert Southworth, Chatsworth, CA (US); Karl S. Papadantonakis, Agoura Hills, CA (US); Bongjin Jung, Westford, MA (US); Arvind Srinivasan, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 402 days.

(21) Appl. No.: 16/912,553

(22) Filed: Jun. 25, 2020

(65) Prior Publication Data

US 2020/0412659 A1    Dec. 31, 2020

Related U.S. Application Data

(60) Provisional application No. 62/868,714, filed on Jun. 28, 2019.

(51) Int. Cl.
*H04L 47/283* (2022.01)
*H04L 43/087* (2022.01)
(Continued)

(52) U.S. Cl.
CPC .......... *H04L 47/283* (2013.01); *H04L 43/087* (2013.01); *H04L 43/16* (2013.01);
(Continued)

(58) Field of Classification Search
CPC ..... H04L 47/283; H04L 43/087; H04L 43/16; H04L 47/125; H04L 47/6205;
(Continued)

(56) References Cited

U.S. PATENT DOCUMENTS

| 7,248,586 B1* | 7/2007 | Hughes, Jr. | H04L 49/508 370/394 |
| 2010/0275037 A1* | 10/2010 | Lee | G06F 13/385 713/323 |

(Continued)

OTHER PUBLICATIONS

Bute, Vikrant, A., et. al., "Review on Network on Chip Router Design", International Journal of Computer Science and Information Technologies, vol. 5 (3), 2014, 3 pages.

(Continued)

*Primary Examiner* — Kibrom T Hailu
(74) *Attorney, Agent, or Firm* — Compass IP Law PC

(57) ABSTRACT

Examples describe an egress port manager that uses an adaptive jitter selector to apply a jitter threshold level for a buffer, wherein the jitter threshold level is to indicate when egress of a packet segment from the buffer is allowed, wherein a packet segment comprises a packet header and wherein the jitter threshold level is adaptive based on a switch fabric load. In some examples, the jitter threshold level is to indicate a number of segments for the buffer's head of line (HOL) packet that are to be in the buffer or indicate a timer that starts at a time of issuance of a first read request for a first segment of the packet in the buffer. In some examples, the jitter threshold level is not more than a maximum transmission unit (MTU) size associated with the buffer. In some examples, a fetch scheduler is used to adapt an amount of interface overspeed to reduce packet fetching latency while attempting to prevent fabric saturation based on a switch fabric load level, wherein the fetch scheduler is to control the jitter threshold level for the buffer by forcing (Continued)

a jitter threshold level based on switch fabric load level and latency profile of the switch fabric.

21 Claims, 11 Drawing Sheets

(51) Int. Cl.
*H04L 43/16* (2022.01)
*H04L 49/00* (2022.01)
*H04L 47/125* (2022.01)
*H04L 49/25* (2022.01)
*H04L 49/90* (2022.01)
*H04L 47/62* (2022.01)

(52) U.S. Cl.
CPC ........ *H04L 47/125* (2013.01); *H04L 47/6205* (2013.01); *H04L 49/25* (2013.01); *H04L 49/3063* (2013.01); *H04L 49/9042* (2013.01)

(58) Field of Classification Search
CPC . H04L 49/25; H04L 49/3063; H04L 49/9042; H04L 47/6255
See application file for complete search history.

(56) References Cited

U.S. PATENT DOCUMENTS

2017/0373982 A1* 12/2017 Ashwood-Smith ..... H04L 47/36
2018/0302329 A1* 10/2018 Seely ...................... H04L 47/26

OTHER PUBLICATIONS

Coffman, K.G., et. al., "Internet Growth: Is There a 'Moore's Law' for Data Traffic?", Handbook of Massive Data Sets, pp. 47-93, J. Abello, P. M. Pardalos, and M. G. C. Resende, eds., Kluwer, 2002, SSRN, Aug. 15, 2000, 3 pages.

Dally, William James, et. al., "Principles and Practices of Interconnection Networks", Elsevier, Morgan Kaufmann Publishers, c 2004 by Elsevier, Inc., 581 pages.

Duranton, Marc, et. al., "HiPEAC Vision 2015 High Performance and Embedded Architecture and Compilation" Seventh Framework Programme, Jan. 2015, © 2015 HiPEAC, 72 pages.

Singh, Arjun, et. al., "Jupiter rising: a decade of clos topologies and centralized control in Google's datacenter network" Communications of the ACM, vol. 59, Issue 9, Sep. 2016, pp. 88-97, https://doi.org/10.1145/2975159, 3 pages.

* cited by examiner

DYNAMIC VIRTUAL CUT-THROUGH AND DYNAMIC FABRIC BANDWIDTH ALLOCATION BETWEEN VIRTUAL CUT-THROUGH AND STORE-AND-FORWARD TRAFFIC

RELATED APPLICATION

The present application claims the benefit of priority date of U.S. provisional patent application Ser. No. 62/868,714, filed Jun. 28, 2019, the entire disclosure of which is incorporated herein by reference.

DESCRIPTION

Data growth (e.g., storage, communication, etc.) outpaces Moore's law and in particular bandwidth requirements in cloud data centers doubles each year. In networking applications, switches are used to route packets received from a medium (e.g., wired or wireless) from an ingress port to an egress port. In switches, a radix includes a number of ports. In order to sustain scalability as required by hyperscale datacenters, switching application specific integrated circuits (ASICs) are used to continuously scale switch radix and switch bandwidth while reducing switch latency. As the radix of a switch scales, crossbars become less scalable. Crossbar complexity increases exponentially (e.g., $n^2$), versus other topologies whose complexity is smaller. Thus, depending on the precise implementation technology (e.g., semiconductor process node), this complexity may become a feasibility constraint. Therefore, other topologies are common choices for the switch's internal fabric.

DETAILED DESCRIPTION

Figure 1:
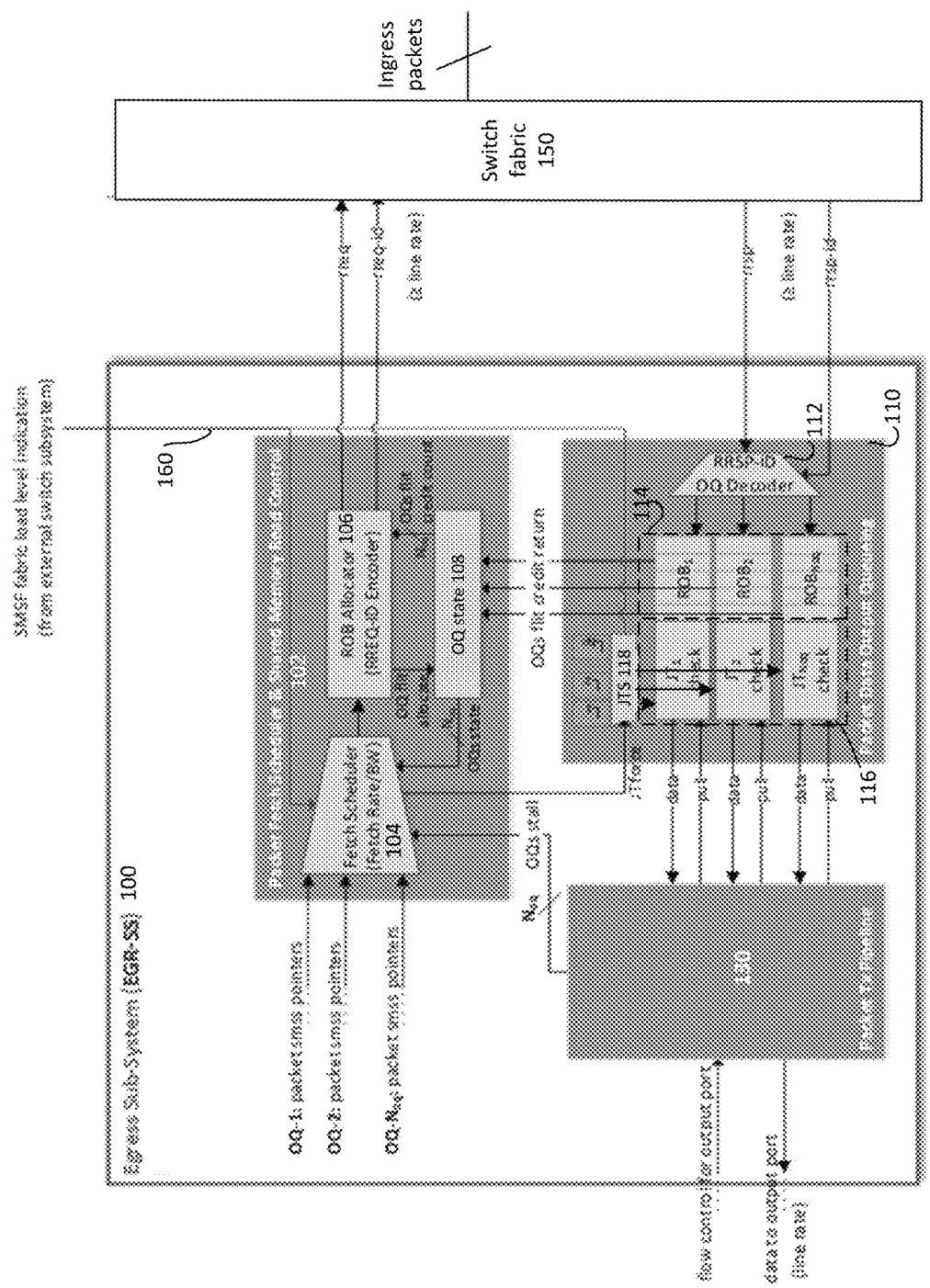
FIG. 1 depicts an egress sub-system in accordance with some embodiments.

Some switch fabric topologies present two properties: (1) unknown (unpredictable) latencies for packet segment retrieval, and (2) out-of-order packet segment delivery to the egress logic. Moreover, the cumulative distribution function (CDF) for the packet segment retrieval random latency (e.g., fabric's latency profile) is generally workload-dependent. Switches using these type of internal fabrics present three main issues: (1) these switch fabrics are prone to packet underruns when supporting Virtual Cut-Through (VCT) (e.g., a mid-packet segment is not retrieved in time for its scheduled egress which forces the switch to truncate the packet. (2) Exploiting the switch fabric's bandwidth overspeed (when available) results in systematic latency increase for all flows (e.g., in general, the more loaded the switch fabric is, the higher the latency profile is). (3) Under heterogeneous traffic patterns (e.g., Elephant flows and mice flows), short packets retrieved after large packets may suffer extra latency, due to the higher probability that at least one of the multiple segments in the large packet (fetched prior to the short packet) could suffer a large (tail) latency. An example class of fabric with these properties are the shared memory switch fabrics (SMSF), such as shared memory mesh or tori.

A potential problem with some switch fabrics is their workload-dependent latency variability (jitter) and the associated out-of-order delivery of packet segment fetching responses (for these type of fully-connected networks, the average latency, and the overall latency profile or CDF, varies in a workload-dependent way). These factors generate two main issues for generic switch internal fabric: (1) prone to packet underruns when supporting Virtual-Cut-Through (VCT) (e.g., a mid-packet read request does not complete in time, while packet transmission has already started and thus the packet is to be truncated at egress) and (2) exploiting generic switch internal fabric's bandwidth overspeed results in systematic latency increase for all flows (in general, the more loaded the fabric is, the more skewed the latency profile is towards higher values).

Moreover, in some types of networks (e.g., Ethernet), packet length is not known a priori and no simple header field indicates the complete packet size. Therefore, switches for this type of network need to support blind-VCT (e.g., when a packet can start egressing the switch before an exact packet size is known).

Furthermore, when network switches are required to support deep header inspection and modification, latency incurred by output-port dependent packet processing (e.g., header processing, egress-access control list (ACL) checking, encapsulation, de-encapsulation, in-band telemetry data insertion, and so forth) may become non-negligible. In such cases, serializing the packet processing latency with the switch fabric latency may become prohibitive.

At least two trivial solutions to the underrun problem in switch fabrics exist. One solution is to enforce Store-And-Forward (SAF) mode, at the switch egress buffers, for each and every packet (independently of the flow it belongs to). A systematic increase in switch latency (e.g., full packet fetching time becomes exposed as latency) occurs for all types of flows/traffic (both latency-sensitive and latency-tolerant traffic), thus becoming a less attractive for high performance/low latency requirements.

Another solution is to enforce a strict back-off limit to the offered load for the switch fabric on each of the egress logic blocks (e.g., on all output ports). The switch fabric interface overspeed for each of the switch internal fabric ports may never be fully utilized, which guarantees that, if the back-off is large enough, the global load state of the switch fabric is bounded, which in turn may guarantee that the observed latency profile is bounded by design. However, overall, switch fabric's performance is underutilized by forcing packet fetch from switch fabric at-speed (or near-speed), or equivalently the switch fabric design requires overprovisioning, which makes it less cost-effective. Moreover, in this case, the switch fabric will not enable a reduction of the head latency experienced by packets during in-cast situations (e.g., where it is highly likely that packets are fully received into the switch by the time they are scheduled for egress).

Some solutions provide multiple output data queues on egress port logic to enable segregation and reprioritization of traffic on egress side. The multiple output data queues provided per egress port logic can all have the capacity of an MTU (plus the worst case fabric roundtrip delay) in order to support flow control (e.g., Xon/Xoff) and fully utilize the output port bandwidth. Therefore, if the switch can support large MTU (e.g., jumbo frames), then the buffer size per-egress port becomes prohibitory (e.g., one jumbo sized buffer per output data queue per egress port).

Various embodiments attempt to address support of adaptive VCT and adaptive fabric bandwidth utilization in a switch fabric to attempt to minimize switch egress latency constrained to keeping the probability of underrun sufficiently small while enabling dynamic switching between VCT and SAF (e.g., as a fallback for extreme switch fabric congestion cases). Various embodiments provide adaptive adjustment of a "jitter-threshold" enforcing technology, which prevents underruns with 100% guarantee for latencies within a bound of latencies, and probabilistically prevents underruns for larger latencies. A jitter-threshold can be configured based on the switch fabric latency profile to guarantee an arbitrary low underrun probability (e.g., $10^{17}$ underrun probability or other probability). Various embodiments provide adaptive/dynamic features that are controlled at run-time based on the current state (load level and corresponding latency profile) for the switch fabric. Various embodiments provide an adaptive latency optimization based on the particular workload being experienced by the switch at any given moment, instead of a worst case latency suffered by a design targeting the worst case fabric latency only (e.g., always operating under worst case scenario configuration). In some examples, jitter threshold is not larger than a maximum transmission unit (MTU) size.

In the case of adaptive jitter-threshold and adaptive fetch bandwidth, adaptation can be specified by providing a distribution of configuration values, and associated conditions matching a configuration of the distribution. Configuration values can be specific for egress-side buffering to prevent underrun (e.g., in the case of adaptive jitter-threshold), or packet fetch overspeed (in the case of adaptive fetch bandwidth). These distributions and adaptation conditions can be exposed to system administrator to enable optimization of the network, e.g., there is no single distribution that performs optimally for all network traffic workloads, and therefore the configuration guiding the adaptation can be exposed.

Various embodiments attempt to hide egress header processing latency by parallelizing the egress packet processing latency with a packet "jitter-threshold" compliance latency (e.g., the time required for a packet to comply with the jitter-threshold). Moreover, the egress packet processing latency for the next-in-line packet may be opportunistically hidden behind (parallelized with) the streaming latency for the previous packet by processing a header of a packet while a prior packet egresses.

In some embodiments, multiple queues are provided to store packets, and each queue has its own independent jitter-threshold, and each jitter-threshold can be smaller than or equal to the MTU for the associated queue. Moreover, various embodiments provide multiple independent MTU (or maximum packet size allowed), one per output queue, and opportunistic traffic reordering to prevent the extra latency in heterogeneous packet size traffic conditions (e.g., elephant or mice), while enabling dynamic switching between VCT and SAF (e.g., as a fallback for extreme mesh congestion cases).

Various embodiments enable adaptive utilization of switch fabric overspeed to reduce per flow latencies while not causing a global impact on the switch fabric. Moreover, the adaptive utilization of the switch fabric overspeed allows for a self-regulation of the fabric that minimizes the probability of saturation or destabilization. Moreover, the various embodiments can improve traffic segregation and increase the port bandwidth utilization (e.g., avoids the case of a previously-fetched large packet experiencing large fabric latencies from impacting a posteriorly-fetched short packet experiencing average fabric latency). Various embodiments enable fine grain heterogeneous traffic segregation by providing for multiple data output queues per pause class, e.g., data output queues for mice flows in different pause classes, data output queues for elephant flows in different pause classes, and independent data output queues for mice and elephant flows on each pause class. Fetch scheduler (fetch from fabric into the egress subsystem buffer) and egress scheduler (output from egress subsystem buffers into the output port) can operate independently to enable opportunistic egress side reordering to maximize port bandwidth utilization.

On a per-application queue basis (e.g., flow, application queue (e.g., elephant, mice, storage or non-storage flow)), various embodiments can choose MTU to enforce latency and bandwidth basis. Enabling distinct MTU selection on a per-output-queue basis, allowing for a better segregation of heterogeneous traffic (elephant/mice flows) in a non-blocking fashion, for in-premises data centers where the complete network is controlled by one administration entity. This feature can enable the configuration of an assumed maximum packet size allowable on a per-output queue basis, thus requiring all the flows mapped to such output queue to comply with this assumption. This feature can enable a single fixed-sized memory pool for an egress port to be partitioned in multiple output data queues, each of which could have a distinct MTU, thus enabling this heterogeneous traffic segregation without the prohibitive buffer size scaling. Note that the number of output data queues for a specific egress port may be configurable, constrained to the aggregation of all the individual queue sizes (dependent on the individual queue MTUs) fitting in the shared memory pool capacity. Finally, note that the number of data output queues per egress port could be larger than the number of "pause classes" supported by the link (thus potentially mapping each pause class to one of more data output queues).

FIG. 1 depicts an egress sub-system (EGR-SS) system and some of its interactions with a switch fabric. For example, switch fabric 150 can provide one or more fully-connected multi-hop topologies that result in random latencies and out-of-order data delivery. Examples of such topologies include torus, butterflies, buffered multi-stage, etc. An example embodiment of switch fabric 150 includes a shared memory switch fabric (SMSF), although other switch fabrics can be used. Note that while FIG. 1 shows an EGR-SS 100 that handles a single output port, EGR-SS can be scaled to handle multiple output ports and/or port-tiling.

Port tiling can include port grouping (e.g., a smallest possible group being 1 port). Port tiling allows sharing of resources across different ports. An switch internal fabric may have fewer interfaces than the number of egress ports in the switch, but one or more of these interfaces may apply overspeed. For example, in a 256 port switch, the internal switching fabric could have 32 interfaces, each one with at least 8× overspeed, which can be shared by a group of 8 egress ports. Once a port tile is defined, it can be used as a building block to construct a switch. For example, in the 256 port case with tiling of 8 ports, 32× tiles could exist in the switch, so the tile is designed once, and replicated multiple times to construct an ASIC.

A shared memory switch fabric (SMSF) can be any switch fabric connected to all ingress ports and all egress ports in the switch, where ingress subsystems write (store) packet segments into the fabric's memory, while the egress subsystems read (fetch) packet segments from the fabric's memory. In some examples, a segment can represent a size of a packet portion that is retrieved from the switch fabric. A SMSF may be implemented with different fabric topologies, for example tori or mesh networks. An SMSF operation can result in unpredictable delays for packet segment retrieval and out of order delivery of the retrieved packet segments (e.g., responses to read commands are received out of order and with unpredictable latency). SMSF interface bandwidth is assumed to be at least the output port line rate and excess bandwidth is referred to as overspeed.

Packet Fetch Scheduler and Shared Memory Read Control (PFSSMRC) component 102 can include one or more of: processors, software, logic, memory, and storage. PFSSMRC 102 can schedule the order in which packet are fetched from switch fabric 150, across the next-in-line packets yet to be fetched for one or more of the output queues (OQs) of packet data output queueing 110 associated with an output port. PFSSMRC 102 can manage available space of one or more of the OQs. PFSSMRC 102 can issue read requests flits (rreq) to switch fabric 150 specifying a pointer to the packet segment to read, encoding into the flit's request IDs (req-id), the information to steer and reorder the packet segment carried by the response flit (rrsp) into the correct OQ, assuming that the SMSF delivers a flit's response ID (rrsp-id) with at least the same information that was originally encoded into the request ID (rreq-id). PFSSMRC 102 can receive an external fabric load level indication from another sub-system within or outside of the switch. PFSSMRC 102 can receive credit returns for one or more of the OQs (e.g., as packet segments are pulled out of the OQ for their transmission and space is available in the OQ memory buffers). PFSSMRC 102 can receive and process stall indication signals from one or more of the OQs such as when OQs are affected by flow control to an output port. PFSSMRC 102 can generate commands to force the selection of a specific jitter threshold (JT) level for one or more of the OQs.

PFSSMRC 102 can receive stall indication signals for one or more of the OQs which prevents scheduling of new packets to that OQ. PFSSMRC 102 can receive an external fabric load level indication from another switch sub-system that monitors utilization of switch fabric 150 and use the load level indication to adjust the level of SMSF fetching overspeed. The fabric load level indication input to JT selector (JTS) 118 can provide an indication of load on switch fabric 150 and can be used so that the appropriate JT level can be selected in "adaptive" mode.

For example, a fabric load level can indicate a latency level of responses to segment fetch requests. For example, a fabric load level can represent a fabric-load state such as a representation of the outstanding traffic load for the switch-fabric. The fabric-latency level can represent latency probability distribution expected for the switch-fabric. A fabric-latency profile can be dependent on fabric-load level, e.g., via a mapping that depends on network design (e.g., topology, routing protocols, link protocols, and lower design decisions). In some examples, a global fabric load manager (GFLM) or fabric load manager or measurer could measure or encode the fabric-load-level and send the fabric-load-level to all EGS-SS. EGR-SS can internally map fabric-load-level to fabric-latency-level, to map the fabric-latency-level to a JT-level. In some examples, a GFLM or fabric load measurer could measure the outstanding traffic load, and map the traffic load to a fabric-latency profile, which is encoded into a fabric-latency level and broadcast the fabric-latency level as a latency level to one or more EGR-SS. An EGR-SS could map the received fabric-latency level to a JT-level.

Fetch scheduler block 104 can receive pointers OQ-1 to OQ-Noq that indicate the packet segments in switch fabric 150 that should be fetched and delivered to each OQ for their posterior transmission through the associated egress port. Fetch scheduler 104 can decide which OQ to service and corresponding which packets to fetch from switch fabric 150. Fetch scheduler 104 can issue a fetch request for a packet segment to switch fabric 150 by specifying a pointer where the packet segment is located. Fetch scheduler 104 can issue a fetch request using any scheduling policy (e.g., dynamic weighted round robin (DWRR), round robin (RR), weighted round robin, strict priority (SP), etc.). Fetch requests can be generated if there are available credits for the destination OQ as represented by space in the OQ memory buffer. OQ state 108 can maintain a state for one or more OQs, including available space/credits. Fetch requests for packets destined for the same OQ can be made in order (e.g., non-interleaved).

For fetch requests issued by the fetch scheduler 104, ROB allocator 106 can determine a landing slot on the corresponding OQ, allocate such OQ entry from OQ state 108, encode the reordering information into the rreq-id information, and issue the rreq command to switch fabric 150.

Packet Data Output Queueing (PDOQ) 110 can receive from switch fabric 150 the read responses (rrsp) with their associated response ID (rrsp-id) and the requested packet segment. When the corresponding rrsp arrives at PDOQ 110, the rrsp-id is analyzed by the RRSP-ID OQ decoder block 112, which decides a destination OQ and which entry within the destination OQ to store the packet segment. Packet segment storage buffers are provided for OQs. In some examples, OQs can be implemented based on reorder buffers (ROB) 114, which may use information encoded into the rrsp-id to perform the packet segment reordering. In some examples, any ROB 114 can be associated with a traffic class. Optionally, separate ROBs can exist for packet-header segments and packet-body segments to enable separate processing paths for header segments and body segments. PDOQ 110 can generate OQ credit returns to PFSSMRC 102 to indicate availability of space in the OQ memory buffers after packet header and/or payload segments are retrieved from OQs for their processing in the Packet Transmit Pipeline 130. JT checking system and adaptive JT selection system 116 can be used for at least one of the ROB1 to $ROB_{NOQ}$ to set a JT level for a ROB. PDOQ 110 can receive a JT selection command from PFSSMRC 102 to set a JT level for a ROB.

RRSP-ID OQ 112 decoder block can steer a packet segment (e.g., header and body) to the correct OQ (e.g., one of ROB1 to $ROB_{NOQ}$). The ROB can decode from the rrsp-id the information it requires to determine the in-order landing slot for the received packet segment.

Jitter threshold (JT) check logic 116 can receive a JT configuration from among multiple JT configurations (L1 . . . LNjt) via JT select (Sel) 118. Noq can represent the number of OQs associated with a single output port and Njt can represent a number of jitter-threshold (JT) values associated with a single OQ. A jitter threshold level can indicate a number of contiguous head-of-packet segments for the OQ's head of line (HOL) packet that are required to have landed in the OQ's ROB before the packet is allowed to start egressing. A jitter threshold level is to be met prior to when a packet can start egress from a ROB. A jitter threshold level can be an amount of data in ROB or time from when first word fetched for an OQ's HOL packet to when an egress of the data can commence. Jitter can represent a time between when a packet is fetched and when the packet is completely egressed. The configured jitter threshold level can ensure that the probability of underrun is not higher than a target probability given an switch fabric 150 latency profile. In other words, if the JT is configured to (at least) the number of at-rate packet segments that fit within the worst case target switch fabric 150 latency, the worst case target switch fabric 150 latency can be tolerated on all packets.

An OQ can operate in a virtual cut through (VCT)-mode when a configured JT level is smaller than the maximum transmission unit (MTU) for the port. Note that all packets smaller than the configured JT can be fully stored in the OQ before egressing. Packets destined to a VCT-mode OQ are fetched at line-rate or faster.

An OQ can operate in store and forward (SAF) mode when a configured JT level is equal or larger than the MTU for the port (e.g., JT=OQ depth). In some examples, SAF can achieve 0% underrun probability. Packets destined to a SAF-mode OQ can be fetched at rates slower than line-rate. The maximal latency imposed by the JT enforcing mechanism is suffered at most once per burst of packets, without generating bubbles (e.g., time gaps) between packets after being suffered once.

JT select (sel) block 118 can receive a JT force signal from fetch scheduler 104 to set a specific JT level to be used for an OQ. JT select 118 can send a jitter threshold to JT check logic 116 for one or more ROBs. One or multiple JT can be used for one or more ROBs. If a system becomes congested (e.g., the switch internal fabric), a JT can be changed for one or more ROBs. A JT level can be set or changed depending on system conditions (e.g., congestion or load).

Fetch scheduler 104 can force a specific jitter threshold (JT) level to be used for an OQ, for example, based on an internal state (e.g., incast degree, packet drop rate on the Packet Tx Pipeline, etc.), to modify the optimization objective. For example, instead of optimizing latency, fetch scheduler 104 can be configured to optimize output port bandwidth utilization. For example, overriding commands from fetch scheduler 104 can include fallback to SAF-mode when exceptional conditions happen like OQ being stalled, or after underrun was detected. Accordingly, switch latency can be optimized while honoring the target underrun probability and allowing efficient reaction to exceptional cases. Note that both the JT configured value and the adaptation may also be dependent on the port speed (if the port speed is configurable).

JT selector (JTS) 118 can apply an adaptation rule to select the JT value for use by an OQ among the multiple configurations, to be used at the current time. Implementations may vary and instead of having a discrete plurality of JT configurations, it may have a tunable JT within a continuous variation range, with the adaptation rule may be in charge of performing such tuning. An adaptation rule is based on a global fabric load state indication and internal state and can be overridden by commands generated by fetch scheduler 104.

Jitter selector 118 can set a jitter threshold level based on inputs from fetch scheduler 104 (e.g., JT force) and a load level 160. Load level 160 can impact the JT selection. Load level can be an input for the adaptation rule. Fetch scheduler 104 can override the adaptation. So, while fetch scheduler 104 is not overriding adaptation, JT selector 118 can adaptively select an optimal JT level based on the load level 160 generated by an external entity (not depicted in FIG. 1 nor FIG. 2).

Various manners of adjusting JT levels are described next. Jitter selector 118 can use a handshake with a global fabric load monitor (GFLM) to not increase a load on switch fabric 150 until flushing of packets that are in flight (e.g., read issued to switch fabric 150 but packet not received or packet started sending with former JT level when there is a change to the JT level). Decreasing JT level can wait until load throttle is enforced to make sure all packets egressing from all ports do not violate the load throttle by waiting for all packets to finish sending before setting JT rate of new packet(s). For example, decreasing a JT for a ROB can include: programming a lower load throttle, waiting for egress traffic governed by old throttle to reach end of packet/entire packet fetched from SMSF, then decreasing JT for the ROB.

A GFLM (not shown) or load measurer or manager can track an overall load on switch fabric 150 by communicating with each port or port group. A total available bandwidth from switch fabric 150 can be allocated into 3 groups: 1) claimed bandwidth reserved by a port or port group for its current needs; 2) free bandwidth available to be immediately claimed by any port (or port group), to quickly handle an increase in traffic load; and 3) unused bandwidth held aside by the GFLM. The JT handshake described above can be performed when the GFLM changes the amount of unused bandwidth.

In some examples, traffic load on switch fabric 150 can include a number of segments requested but not yet delivered and/or a number of segments not yet requested but committed to be requested soon (e.g. the claimed bandwidth that may have not yet been exercised, but soon will).

Free bandwidth may be held directly by the GFLM or tracked in a distributed manner. When an EGR-SS 100 for a port needs additional bandwidth, EGR-SS 100 may request bandwidth from the GFLM (if the GFLM holds the free pool), or claim it from the free pool itself (if the free pool is distributed). Likewise, when EGR-SS 100 for a port has more claimed bandwidth than needed (plus an optional margin for traffic increases), it can return it to the GFLM or to a distributed free pool. When the free pool is below a minimum threshold, or when more bandwidth has been requested from the GFLM than is available in the free pool, the GFLM can transfer unused bandwidth into the free pool, after performing the JT handshake. When the free pool is above a maximum threshold, the GFLM can perform the JT handshake and then move free bandwidth back into the unused allocation.

A distributed free bandwidth pool may be implemented as a ring connecting the GFLM and all ports or port groups, carrying free bandwidth credits that circulate continuously around the loop. Ports may place credits on the loop to free them, or claim (e.g., remove) credits from the loop when they are available. The GFLM can monitor the size of the free pool by totaling the credits seen in one round-trip-time of the loop and then add or subtract free credits from the loop in order to change the JT, as above. The GFLM may also temporarily remove a small number of credits from the free loop and then add them back, as needed in order to distribute the free credits more evenly around the loop, thus reducing the average latency before a port sees a free credit when it is needed.

Read bandwidth and write bandwidth may be tracked separately by the GFLM. The appropriate JT may depend on both the amount of unused read bandwidth and the amount of unused write bandwidth.

Packet Transmit (Tx) Pipeline (PTP) 130 can schedule packet egress from the OQs (e.g., ROBs) to one or more output ports. PTP 130 can receive and process flow control indications for the associated or more output ports. PTP 130 can propagate stall information to the OQs matching the criteria for the flow control.

Figure 2:
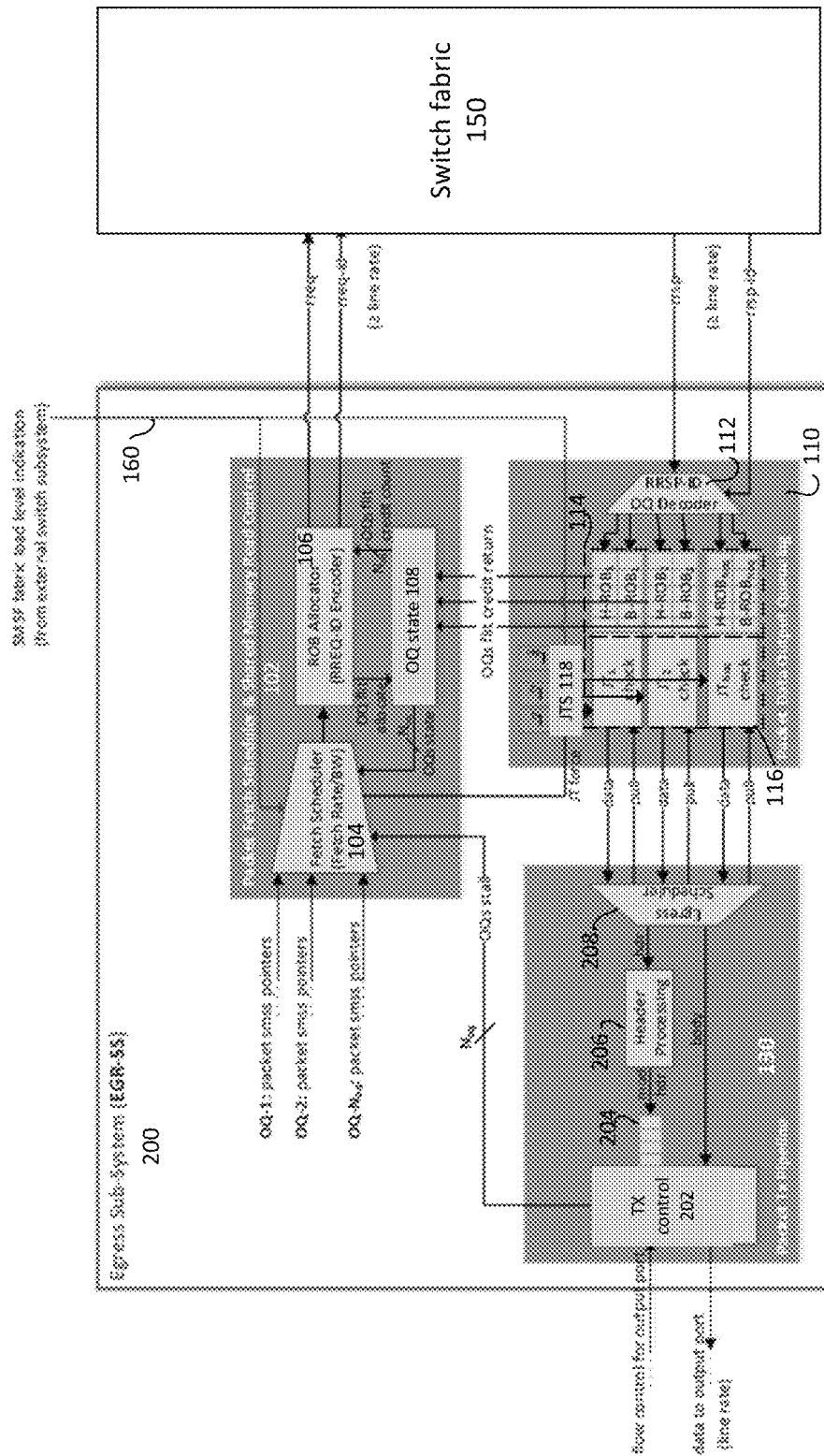
FIG. 2 depicts an example egress sub-system.

FIG. 2 depicts an example egress sub-system 200. System 200 can attempt to hide packet processing latency by adjusting a JT level to hide header processing latency. Some embodiments can attempt to hide header processing latency by streaming or egressing of a body of a packet while processing a header of a next packet to be egressed. In some embodiments, when a packet is ready to be egressed and its JT level is complied with, header processing can be performed. Various embodiments allow pulling of a packet from any ROB if a JT level is complied with. Egress scheduler 208 can choose which packet to egress from a ROB based on complied-with JT level. In some examples, egress scheduler 208 could follow order of fetching packet flits that matches an order by fetch scheduler 104.

For example, header processing latency can be hidden behind the following two latencies: a) the JT level check latency of the same packet and b) the streaming latency of a previous packet.

In some cases, egressing of packets can occur in a different order than the fetch order. If packets, landing on different OQs, become eligible for egress (e.g., JT check ready), in a distinct order with regard to the scheduled fetch order, then egress scheduler 208 can pull the packets in a different order that fetch order to maximize egress port bandwidth utilization (e.g., reduce bubbles (e.g., gaps between egressed packets) in the wire). An example of this case may be fetch scheduler 104 fetching first a large frame (of size slightly larger than the Jitter Threshold) to OQ-0, followed by fetching a minimum-size frame (e.g., a single segment packet) to OQ-1. Then, given the random latencies of switch fabric 150, the minimum-size frame could arrive at OQ-1 before the large packet complies with its jitter threshold in OQ-0. For example, if fetch scheduler 104 schedules a packet fetch from ROB1 and a fetch of a second packet from ROB2. If a head of line packet in ROB2 complies with JT level but packet in ROB1 does not comply with its JT level, egress scheduler 208 allows egress of a packet from ROB2. If ROB1 and ROB2 head of line packet comply with JT, egress scheduler can use any arbitration to schedule packets from ROB1 or ROB2.

In some examples, an OQ can have two associated re-order buffers (ROB), one for packet headers (H-ROB) and one for packet bodies (B-ROB). In some examples, JT check 116 can perform body JT check, header JT check, or both. A header JT check can determine when there is enough payload such that a header can be scheduled for header processing whereas a body JT check can determine when there is enough payload stored such that the packet can start egressing. An OQ can continue to have a JT-enforcing mechanism and the configured JT values take into account the packet processing latency. Having separate header and packet body ROBs can allow a packet header to be processed ahead of time, in parallel with egress of a packet body and hiding its header processing latency.

In a system which implements body JT check only, a packet may be chosen at any time to begin header processing. When a header makes it to the head of modified header queue 204, the body JT check for that packet is performed and when the body JT check is complied with, the packet can begin egressing. This may result in some head of line blocking if another header in the modified header queue 204 complies with its body JT before the head of the queue. The egress scheduler can attempt to reduce the likelihood of this head of line blocking.

In a system which implements header JT check only, a packet can be chosen for header processing when the header JT is complied with. Once the header makes it to the head of the modified header queue 204, it can be egressed immediately. When implementing header JT check only, any packet which takes longer than the minimum latency to exit header processing may be delayed unnecessarily. Header processing latency may vary based on configuration, so header JT check may be adjusted based on the header processing latency. If a system can determine if body JT check is passed, the system can be converted to a header JT check by subtracting a minimum latency through the header processing block.

In a system which implements both header JT check and body JT check, header JT check can be relaxed since the body JT check can be sufficient to achieve the desired underrun probability. Use of header JT check can reduce a probability of HOL blocking in the modified header queue.

Egress scheduler 208 can decide an order in which a packet will be pulled (e.g., copied from a ROB in PDOQ 110) into PTP 130. A packet egress order decided by egress scheduler 208 can be honored for both packet modifications and packet egress so that packets are processed first and, if not dropped, transmitted through an output port. Given that packets corresponding to different flows may be stored out-of-order in their corresponding (distinct) OQ, egress scheduler 208 may decide a packet egress order that is different than the packet fetch order by fetch scheduler 104 to reduce latency by egressing packets that are available for egress from an OQ. Shallow queueing of the modified headers in modified header queue 204 may be applied in cases where packet body sizes are not known a priori.

Egress scheduler 208 can receive eligibility indications from one or more OQ, which notify when there is a head of line (HOL) packet that has complied with the JT enforcement (e.g., either the JT threshold was met or the packet size was shorter than the JT threshold). Once an eligible packet is scheduled for transmission, packet segments are retrieved from the corresponding OQ, at-speed, and pushed into the packet transmission pipeline 130 for transmission using transmit (Tx) control 202.

PTP 130 can support packet drops based on egress packet processing policies for one or more output queues. For example, header processing 206 can analyze a packet header and the analysis may result in the dropping packet after it was fetched. When header processing 206 results in a decision to drop the packet, a drop indication selecting the associated output queue is sent to PDOQ 110, which in turn drains (e.g., drops) all the packet segment of the head-of-line packet in the selected OQ.

Based on a packet segment having been pulled out of an OQ, ROB 114 can make the memory space available for another packet segment by issuing credit to OQ state block 108 to allow use of freed memory.

When a flow control indication is received for an output port, TX control 202 can issue a stall signal for each of the OQs affected by the flow control criterion. TX control 202 can forward stall signals to the OQs and to fetch scheduler 104. An OQ may use this stall signal indication (e.g., !pull) to fallback to SAF-mode operation. Fetch scheduler 104 may use this indication to stop fetching a new packet for the stalled OQ(s), and to re-prioritize switch fabric bandwidth for other OQs if needed when the OQ is configured to fallback to SAF-mode.

Fetch scheduler 104 may use fabric load level indication signal 160 (e.g., fabric-load state or fabric-latency level) to adapt how much of the switch fabric 150 interface overspeed is to be exercised at any given time to prevent fabric saturation. For example descriptions of fabric saturation, see, e.g., Dally and Towles, "Principles and Practices of Interconnection Networks" (Stanford University) 2004. Switch fabric 150 overspeed can be used to fetch segments for each packet at faster than line-rate speed, thus minimizing the exposed latency for accumulation of the JT level at the associated OQ. Overspeed can be used to fetch more than one packet (destined to distinct OQs) simultaneously. For example, a floor (overspeed) worth of VCT packets can be fetched simultaneously. Because VCT packets may not always be fetched with overspeed (e.g., if the packet reception in the switch is not done yet), spare overspeed can be used to fetch SAF packets at sub-line-rate. This adaptation of the bandwidth utilization can provide a self-regulating mechanism for switch 150.

Various embodiments provide layer 3 (L3) multicast replication at the egress for a port. A packet can be fetched from switch fabric 150 once per output port but pulled out of the output queue (into the egress pipeline) multiple times instead of making repeated requests to switch fabric 150 and responses from switch fabric 150.

Figure 3:
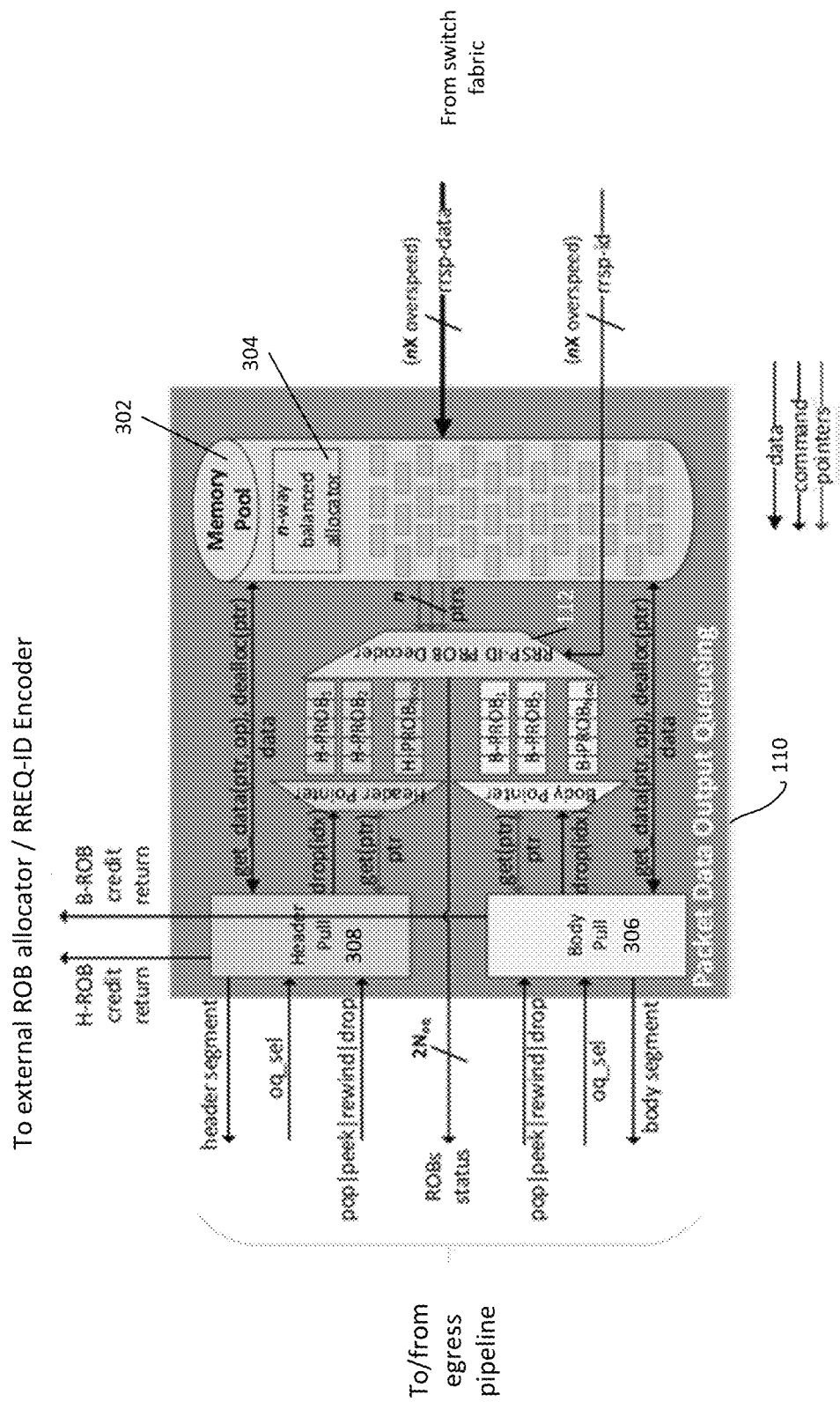
FIG. 3 depicts an example of an egress packet data output queueing.

FIG. 3 depicts an example of an egress packet data output queueing (PDOQ) 110 based on shared memory pool with pointer reordering system for egress header and payload packet buffering. Fetch scheduler (e.g., fetch scheduler 104) generates an ID (rreq-id) for each packet segment read request (rreq), for a particular section of packet (e.g., header or body) from switch fabric 150.

Switch fabric 150 can include one or more response ports (e.g., two sets of three). In some examples, a response port can receive one flit of data (e.g., 64 bytes) each clock cycle. As responses may be out of order, there can be no guarantees about the mix of responses. For example, the three responses in a set could all be headers for different packets or they could all be part of the same packet.

Switch fabric 150 can provide rrsp-data that can include a read response data of packet segment data and corresponding rrsp-id that can be an identifier of a read request or change to packet segment identifier. An interface between an PDOQ 110 and switch fabric 150 can permit nX overspeed with respect to the nominal output port line rate. Requests provided to switch fabric 150 at or over speed can reduce packet latency until jitter threshold level is covered. If requests fetch at speed or overspeed, responses could get to egress at full fabric speed, which is faster than request speed.

Response data (e.g., packet segments) from switch fabric 150 can be placed into a memory pool. The memory locations can be chosen by an n-way balanced allocator 304 which attempts to keep the memory banks balanced while avoiding bank conflicts. For example, n segments can be written in parallel into a memory pool. A shared memory pool, composed of multiple banks, can have multiple (n) write buses and an n-way load balancing allocator (keeping bank utilization balanced), in order to guarantee that high rate response bursts can be stored in parallel.

Memory pool 302 can include minimum allocation units (e.g. to store a single packet segment) that can be allocated to any of the OQs. Output queues can share memory pool 302, and each queue can have a statically configured size, plus a first come first served (FCFS) partition of the pool.

Pointer Reorder Buffers (PROB) are used to store memory pool allocation unit pointers, in egress order, for each OQ. A PROB must allow multiple (n) pointers to be written concurrently to the same OQ. Because reads are at line-rate, a shorter amount of read buses can be used (e.g., one for body and one for header look-ahead). The shared memory pool (ROB) allocator 304 provides deallocation service to support packet drops without requiring reading out the packet segments. As long as deallocation rate matches allocation rate, overall egress pipeline performance is not impacted.

Response identifier (ID) (rrsp-id) and the chosen destination in memory pool 302 can be sent to the PROBs where they are stored in per-OQ packet order. Memory pool 302 can generate n pointers of locations in memory pool 302 which indicate response data writes for n lanes. The rrsp-id can be used for pointer reorder. There are n lanes on which each pointer is provided and a rrsp-id can be provided on the same lane number in a separate path.

Based on an rrsp-id, the RESP-ID OQ decoder 112 can determine the destination PROB and the landing slot (order) within that PROB for the received packet segment. Moreover, the RESP-ID OQ decoder 112 can distinguish between body or header portions and thus independently manage a header PROB (H-PROB) and a body PROB (B-PROB) for each OQ, the former used for header segment reordering and the latter used for body segment re-ordering. RESP-ID OQ decoder 112 can reorder pointers in order corresponding to proper ordering of the related packet segments. Other information can be encoded in RRSP-ID ROB decoder 112.

Pointer re-order buffers (PROB) can store and re-order pointers to packet segments in memory pool 302. PROB can re-order the pointers to the shared memory pool instead of re-ordering the actual data. The ROB ordering for the responses can be encoded and decided by a ROB allocator (e.g., ROB allocator 106 of FIG. 2). Based on pulling data out of the ROBs, output queuing system 110 can return credits to OQ state 108.

In-order header look-ahead can be performed to process headers ahead of time and hide the header processing latency. An egress scheduler (e.g., egress scheduler 208) can pull a portion of a header from a H-ROB for processing prior to egressing an associated body portion. Header processing can include egress-access control list (ACL) checking, encapsulation, de-encapsulation, in-band telemetry data insertion, and so forth. Ahead-of-time header processing can hide header processing latency with the body buffering latency.

In some examples, a modified header in-order pointer buffer (MD-IOB) can be used in addition to B-PROB and H-PROB. Because a modified header can be pulled (popped or peeked) from a queue when it is time to transmit the packet, body pull 306 could perform body pull involving pops or peeks in B-ROB or a modified header pull involving pops or peeks in the MD-IOB.

Header pull 308 can issue dealloc(pointer (ptr)) to memory pool 302 to deallocate pointer and memory space. Header pull 308 can provide pop and peek/rewind logic for P-ROBs, to enable reading the same packet multiple times (e.g., L3 multicast replication on egress side). Header pull 308 can respond to oq_sel signal from egress scheduler 208 to select an OQ (and the associated PROBs). The control of which packet is read multiple times, and how many times, can be provided by egress scheduler 208.

Header pull 308 can support pop, peek, rewind, or drop. Pop can refer to retrieving a segment out of a buffer and deallocating space in memory pool 302. Peek can refer to looking at content of complete packet and advancing a header of a queue but not removing packet content and keeping content in memory pool 302 and not giving credit back to ROB allocator 106. Rewind can refer to rewinding a pointer to a beginning of a packet and can work with peek to indicate if content is already in pool 302 such as in a multicast case. Drop can refer to dropping a packet in memory pool 302 and giving credit back to ROB allocator 106. For example, header processing using ACL can indicate a packet drop. ROB status can refer to whether a ROB is empty or full.

Figure 4:
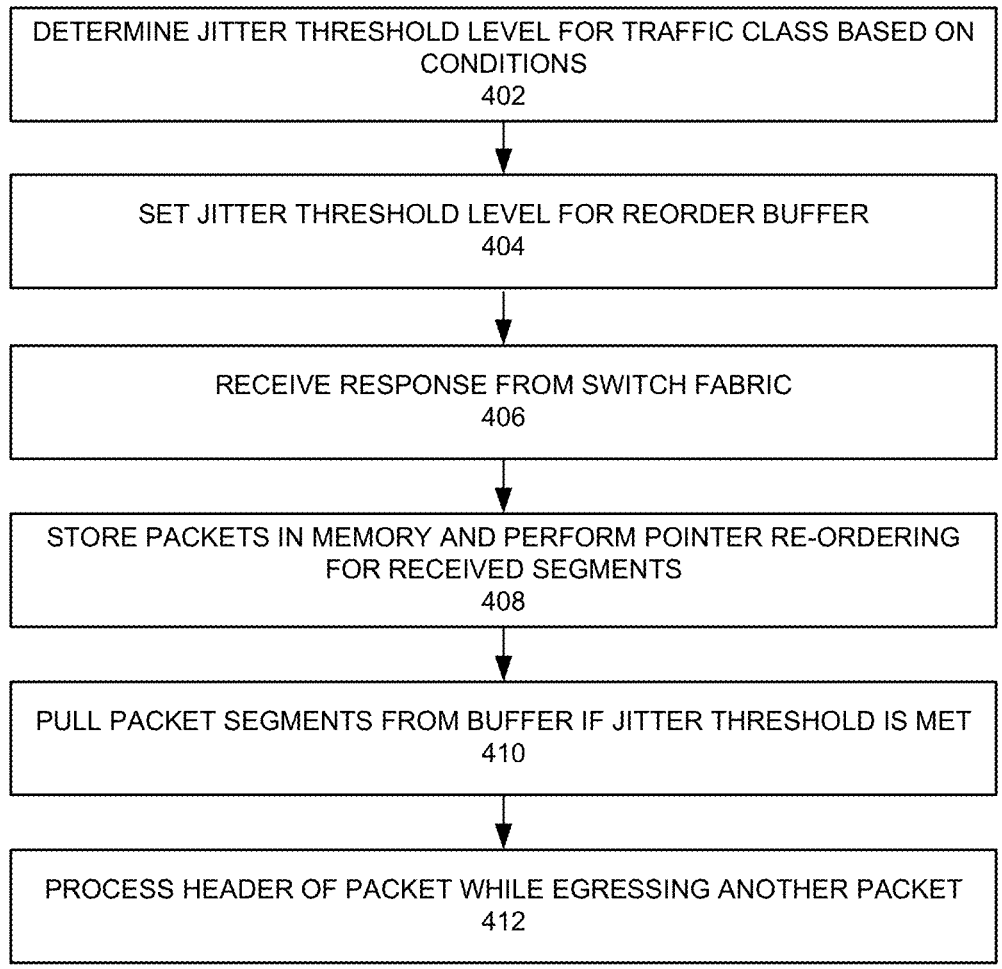
FIG. 4 depicts a process.

FIG. 4 depicts an example process. The process can be performed in a switch or network interface by an egress system for an egress port. At 402, the process can determine a jitter threshold level for a traffic class based on conditions. A jitter threshold level can indicate a number of contiguous head-of-packet segments for a ROB's head of line (HOL) packet that are to be in the ROB before the packet is allowed to start egressing. A jitter threshold level can be set based on a timer such that a JT level is met at expiration of a timer that starts at a time of issuance of a first read request for first segment of a packet (e.g., header). For example, conditions can be based at least in part on one or more of incast level, packet drop rate in a transmit pipeline, objective, or at-rate packet segments that fit within a worst case target switch fabric latency. An objective can be to optimize latency or optimize output port bandwidth utilization.

A traffic class can be identified by a set of defined N tuples and, for routing purpose, a flow can be identified by tuples that identify the endpoints, e.g., the source and destination addresses. For content based services (e.g., load balancer, firewall, intrusion detection system etc.), flows can be identified at a finer granularity by using five-tuples of packet control fields (e.g., source address, destination address, IP protocol, transport layer source port, and destination port) or larger tuples of packet control fields.

At 404, the process can set a jitter threshold level for a reorder buffer (ROB). For example, a ROB can be allocated to store header or payload of packets associated with one or more traffic classes. A ROB can have an associated header-ROB (H-ROB) to store a portion of a header of a packet and a body-ROB (B-ROB) to store a portion of a body of a packet. In some examples, an H-ROB can store an associated pointer to a header portion in a memory pool and a B-ROB can store an associated pointer to a body portion in a memory pool.

At 406, the process receives a response from a switch fabric. The response can include packet data (e.g., header or body) and an identifier based on a packet retrieval request made to the switch fabric. At 408, the process stores portions of the response into a memory pool and provides pointers to data and header in the memory pool that can be used for reordering packet portions. At 408, the process performs pointer re-ordering to reorder pointers so that packet header and body segments are arranged in order to re-create the packet prior to processing and egress. In some examples, one or more pointer reorder buffers (P-ROBs) can be used to reorder pointers for header and body portions.

At 410, the process permits pulling of packet segments from a particular ROB if a jitter threshold level for the particular ROB is met. A jitter threshold level can be specified per PROB (e.g., a single PROB per OQ, or one H-PROB and one B-PROB per OQ). At 412, the process performs header processing of a packet while egressing a body portion of another packet. Egressing a prior packet can include transmitting a body portion of another packet from an egress port. Header processing can include egress-access control list (ACL) checking, encapsulation, de-encapsulation, in-band telemetry data insertion, and so forth. Header processing of a packet while transmitting another packet can hide latency associated with the header processing.

In some examples, applications use a virtual network interface and share physical network interface resources. For example, single-root I/O virtualization (SR-IOV) can be used whereby a single PCIe physical device under a single root port can appear as multiple separate physical devices to a hypervisor or guest operating system. SR-IOV can use physical functions (PFs) and virtual functions (VFs) to manage global functions for the SR-IOV devices.

Various embodiments permit an application to choose a particular MTU size to enforce latency and bandwidth for an application queue (e.g., flow, application queue (e.g., elephant, mice, storage or non-storage flow)). Enabling distinct MTU selection on a per-OQ basis can allow for a better segregation of heterogeneous traffic (e.g., elephant or mice flows) in a non-blocking fashion, for in-premises data centers where the complete network is controlled by one administration entity. Enabling distinct MTU selection on a per-OQ basis can enable configuration of an MTU on a per-output queue basis, thus causing all the flows mapped to such output queue to comply with this configuration.

Per-output-queue MTU size selection can be configured in a fixed-sized memory pool (e.g., single memory pool) for an egress port and allow the memory pool to be partitioned into multiple output data queues, each of which could have a distinct MTU configuration and accordingly a distinct queue depth, thus enabling heterogeneous traffic segregation without uniform buffer size scaling, which in most cases would exceed memory capacity. A number of output data queues for a specific egress port could be configurable, but constrained to aggregation of all the individual queue sizes (dependent on the individual queue MTUs) fitting in the shared memory pool capacity. A number of data output queues per egress port could be larger than the number of "pause classes" supported by the link (thus potentially mapping a pause class to one of more data output queues).

Various embodiments can permit traffic segregation to enable latency hiding and attempt to improve utilization of output port bandwidth. Traffic segregation and latency hiding features can be independent of adaptive VCT and adaptive fabric bandwidth utilization or Jitter Threshold (JT) based behavior described earlier.

Various embodiments can permit a traffic class to mix different flows (e.g., mouse flows versus elephant flows). For example, a mouse flow can be a relatively shorter flow (in terms of total number of bytes) than an elephant flow. To reduce the latency penalty suffered by intermixing different flows (e.g., mice flows versus elephant flows) into a single traffic class, various embodiments provide at least one distinct virtual lane mapped to an OQ, on top of a physical link, where a virtual lane has an associated independent virtual-MTU in order to segregate flows with consistently different traffic profiles to distinct lanes. Note that while this feature is non-standard for certain networking technologies, e.g., Ethernet, as long as both sides of a link implement this feature, it can be exploited without violating any network level specification. In some cases, a packet not complying with the virtual lane's virtual-MTU associated with the virtual lane to which the packet's flow is mapped to, represents a network configuration error and thus it can be dropped and an error event can be identified.

Various embodiments dynamically re-allocate fetch bandwidth between mice and elephant flows and dynamically force the elephant-flow OQ to SAF-mode (JT forcing), as soon as high priority mouse flow arrives at the EGR-SS. This allows a "late arriving" high priority mice flow quickly skip ahead (deterministically, not opportunistically) an earlier arriving elephant flow in an OQ. After the mice flow has been egressed, bandwidth allocation and OQ JT adaptation can be stabilized back to normal for the elephant flow. In some examples, a flow can be identified as an elephant flow based on larger sized tuple in a packet header or parsing packet layer headers (e.g., session layer, presentation layer, or application layer).

Various embodiments provide traffic segregation operation with VCT. Adaptive latency reduction can attempt to ensure that packet headers can be processed and egressed earlier, thus reducing overall header latency. Furthermore, if a processed header buffer segregates headers per OQ, latency hiding for the header processing can occur while waiting for JT to be complied with for the body portion.

Various embodiments support JT adaptation for multiple OQs by use of: (1) single JT adaptation with single configuration, using a same configuration for all OQs; (2) single JT adaptation with multiple configurations with one configuration per OQ; or (3) multiple JT adaptations, each with its own configuration, where a JT adaptation is applied per OQ (including virtual lanes). Packet eligibility conditions for egress scheduling can include: (1) all header segments have landed in an H-ROB; (2) jitter threshold for the B-ROB is complied with; and (3) the OQ is non-paused (e.g., not subject to flow control).

Figure 5:
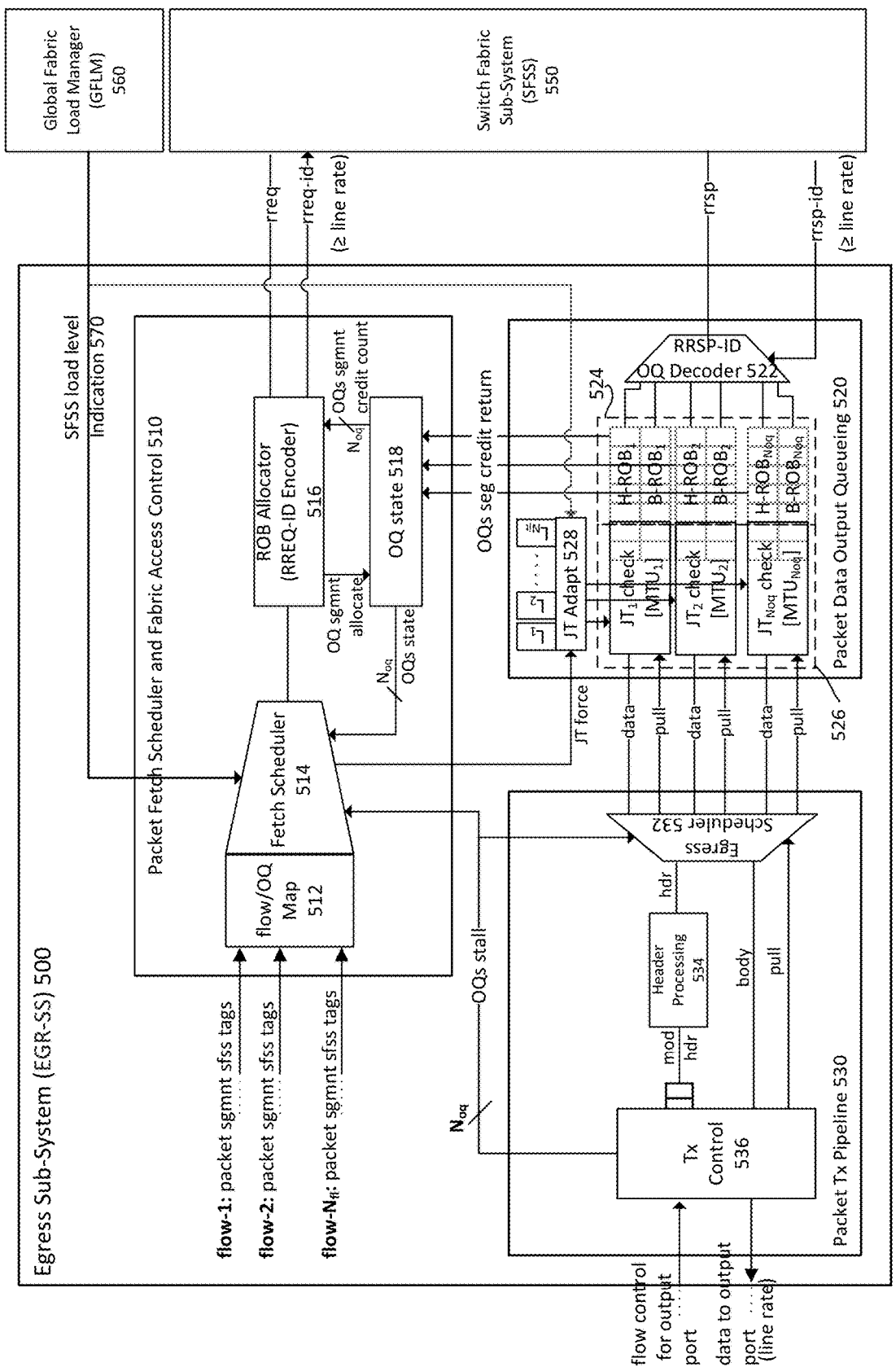
FIG. 5 depicts an example egress sub-system.

FIG. 5 depicts an example system which can address a problem of adaptively reducing EGR-SS latency while preventing packet underruns. Various embodiments provide an Egress Sub-system (EGR-SS) for high performance switches utilizing internal Switch Fabric Sub-system (SFSS) with unpredictable latency and out-of-order segment delivery. In some examples, an SFSS interface bandwidth can be at least the output port line rate and excess bandwidth can be overspeed. Various embodiments provide an EGR-SS for a single output port, that can be easily scaled to support a group of output ports and port-tiling. Various embodiments support: (1) Nfl number of flows associated with a single output port, (2) Noq number of output queues (OQs) associated with a single output port, and (3) Njt number of jitter-threshold (JT) values associated with a single OQ. In some examples, latency reduction can be independent of the number of OQs supported for an associated output port (Noq).

A same MTU for all queues may impose too high a memory requirement. But different MTU sizes can allow the queues to be allocated within a memory device. Queue sizes can be smaller than MTU sizes to prevent the SAF mode, which can hinder the SAF fallback option (due to fabric load level).

Global Fabric Load Manager (GFLM) 560 can track the overall load on switch fabric sub-system (SFSS) 550 and generate an SFSS load level indication signal 570 indicative of load on SFSS 550. GFLM 560 can be part of SFSS 550 or separate from SFSS 550, but outside of EGR-SS 500. Multiple distinct technologies can be used to track SFSS load. For example, a port-tile can track statistics of fetch delay (e.g., mean value, variance, mode, maximum, etc.) and report such statistics to GFLM 560. Statistics could be gathered either via sliding windows or via non-overlapping windows, with configurable window sizes, etc. GFLM 560 can use the aggregate statistics to infer the global load level of SFSS 550.

GFLM 560 can control distribution of the total available SFSS bandwidth across all switch output ports or group of switch output ports (e.g., port-tiles). A port-tile can be a tile of a single port or encompass groups of ports or individual ports, without loss of generality. For example, GFLM 560 can allocate the SFSS bandwidth into three groups: (1) claimed bandwidth reserved by a port-tile, (2) free bandwidth available to be immediately claimed by any port-tile, and (3) unused bandwidth held aside by GFLM 560 (e.g., bandwidth back-off). Free bandwidth could be held by GFLM 560 or tracked in a distributed manner. When a port-tile has more claimed bandwidth than it needs or uses, the port-tile can return bandwidth to GFLM 560 (or the distributed mechanism). When a port-tile requires more bandwidth than it has currently claimed, the port-tile can claim bandwidth from the free bandwidth available for immediate claiming (e.g., bandwidth in group (2)). GFLM 560 can track fetch bandwidth available in groups (2) and (3) to estimate the SFSS (e.g., worst case) load. In some examples, GFLM 560 may move bandwidth allocation from group (2) to group (3) reactively, based on global aggregate statistics, when appropriate (global) switch conditions to do so are met, or from group (3) to group (2).

Packet Fetch Scheduler and Fabric Access Control (PFS-FAC) 510 can receive a sequence of packet segment SFSS tags (e.g. a descriptor or reference to a specific segment of a packet that is understandable by the SFSS, where a segment can refer to an atomic unit of data that is transferable across the SFSS) for at least one of the Nfl flows egressing through the associated output port. The SFSS tags can be provided by a tag distribution mechanism between ingress subsystems and egress subsystems. Flow/OQ mapper 512 can map Nfl incoming flows of packet segment tags to the Noq OQs associated with the output port. Fetch scheduler 514 can schedule packet fetching and issue fetch requests to ROB allocator 516 for each segment of a scheduled packet. Scheduling can account for multiple OQs, their state, and the amount of flows mapped to the OQ. Bandwidth allocation can be performed on a per-flow basis (not per-OQ basis). In some examples, flow control indications can be received from packet transmit pipeline 530 on a per-OQ basis. Fetch scheduler 514 can re-allocate fetch bandwidth of "paused" flows (e.g., flows mapped to a paused OQ due to flow control), to un-paused flows. Any policy can be used for bandwidth allocation and reallocation.

Based on these per-flow sequences of tags, fetch scheduler 514 can schedule an order in which packets are to be fetched from SFSS 550. Fetch scheduler 514 can pick packets from the set of per-flow next-in-line packets using any desired scheduling policy (e.g., SP, round robin (RR), weighted round robin (WRR), dynamic weighted round robin (DWRR), etc.). Fetch scheduler 514 can perform adaptation of the packet segments fetch rate based on a current value of SFSS load level indication 570. Fetch scheduler 514 can control the fetch bandwidth, e.g., the rate at which fetch commands are issued to SFSS 550. Fetch rate can fall into at least one of three categories: (1) faster than line rate (e.g., using SFSS interface overspeed), when load level is below nominal and there are free bandwidth credits from GFLM 560 available for allocation; (2) at exactly line rate (e.g., without using SFSS interface overspeed), when the load level is nominal and/or there are no free bandwidth credits from GFLM 560 available for allocation; or (3) lower than line rate (e.g., using less than SFSS interface nominal speed), when the load level is above nominal, and potentially returning previously allocated bandwidth credits to GFLM 560.

Fetch scheduler 514 can schedule packet fetching and issue fetch requests to ROB allocator 516 for each segment of a packet scheduled for egress. ROB allocator 516 can service fetch requests from fetch scheduler 514 by issuing a read request (rreq) fetch command to SFSS 550. A fetch command to SFSS 550 is labeled as rreq, and is accompanied by a read request ID (rreq_id) which carries the metadata for the command. ROB allocator 516 can attempt to avoid packet data loss and PDOQ buffer overflow by ensuring that packet segment fetch commands are generated only if there is available OQ segment credits for the destination OQ in PDOQ 520, and can encode the destination OQ and landing slot within the OQ as part of the fetch command metadata. OQ state 518 can track state of at least one OQ, including available segment slots/credits, and make this state available and updatable.

An SFSS interface to system 500 can have overspeed with regard to the output port rate, which can be embodied by one or more of: higher clock rates for the SFSS interface, wider SFSS interface (e.g., wider than a packet segment), or by providing multiple SFSS interfaces for each output port or output port tile, or a mix of all the previous options. For example, an SFSS interface corresponding to an output-port tile can include a set of rreq ports and a corresponding set of rrsp ports. An rrsp port can return one flit (e.g., a segment or fraction of a segment) of data each clock cycle. Since responses may be out of order, there can be no guarantees about the mix of responses. For example, the three responses in a set could all be headers for different packets, they could be body pieces of distinct packets, or they could all be part of the same packet.

Packet Data Output Queueing (PDOQ) 520 can receive fetched packet segments and provide data to packet transmit (Tx) pipeline 530. A fetch response from SFSS 550 is labeled as read response (rrsp), and can be accompanied by a read response ID (rrsp_id) and may correspond to a rreq_id for the associated rreq. OQ decoder 522 can receive the fetched packet segments (responses to the issued fetch commands) and corresponding rrsp from SFSS 550 (which may arrive out of order), and when multiple OQs exist for the output port, steer the packet segment to the allocated ROB OQ in ROB 524. In cases where a single OQ is allocated for the output port, or in other cases, this steering is not performed. In some examples, a ROB OQ in ROB 524 can include at least one header segment reorder buffer (H-ROB) and at least one body segment reorder buffer (B-ROB). This dual-ROB structure can enable header processing to occur during fetching of the same packet's body segments and egressing (streaming out) of the body of another packet from another OQ.

A ROB 524 can receive retrieved packet segment associated with rrsp-id. A ROB 524 can re-order packet segments incoming to an OQ, and buffer such packet segments in the appropriate landing slot (e.g., appropriate order). ROB 524 can generate OQ segment credits (shown as OQs seg credit return), as packet segments are pulled out of the OQs to be egressed through an output port, and forward such credits to OQ state 518. ROB sizes (depths) can be configurable (e.g., as a function of the OQ's MTU), and potentially distinct for the ROBs associated with distinct OQs.

In some examples, any ROB OQ in ROBs 524 can be configured with an independent (and potentially distinct) Maximum Transmit Unit (MTU) that provides a virtual-lane on top of an Ethernet link, and allowing OQs to be different sizes with a per-OQ MTU. A number of virtual lanes (OQs) supported per-egress port can be configurable, potentially constrained to the condition that the aggregation of all the OQ depths to be lower than or equal to the shared memory pool capacity. An OQ's depth can be dependent on the OQ's MTU. In some examples, if the aggregation of all the OQ depths is lower than the memory pool capacity, remaining capacity of an OQ can be utilized as a first come first served dynamic allocation partition that may be used to temporarily grow any individual OQ with high demand. The following two properties can exist for the shared memory pool partitioning into OQs: the maximum number of OQs supported by the shared memory pool can be given by the memory pool size divided by the smallest supported MTU and the minimum number of OQs supported by the shared memory pool, without forcing a larger than necessary FCFS dynamic allocation partition, can be given by the memory pool size divided by the largest supported MTU.

When the number of virtual lanes (OQs) is larger than the number of pause classes (e.g., pausable classes in Priority-based Flow Control (PFC) for Ethernet), segregation of heterogeneous flows (e.g., mice and elephant) on a per-pause class basis can occur. A shared memory pool per-egress port can be configurable into partitions for each OQ, where a partition may be of a distinct size in accordance to the virtual lane's MTU.

Various embodiments use a common fixed-size memory pool which is partitioned across the different OQs for a specific port based on run-time configuration, thus allowing every OQ to size its buffer according to a configured MTU. For example, assuming a 64 KiB buffer per egress-port, and ignoring the buffering to cover the fabric's maximum roundtrip delay target (and thus support sustained bandwidth without gaps), the memory pool could be partitioned in at least the following configurations:

- 32xOQs, each with MTU=2 KiB. This could enable grouping multiple OQs per pause class in Ethernet PFC (e.g., 4 traffic segregation queues per pause class).
- 6xOQs, each with MTU=10 KiB (jumbo frame), and 4 KiB for FCFS dynamic allocation. This could enable 6 (out of 8) of the pause classes in Ethernet PFC without blocking (or the full 8 but with blocking across pause classes), all supporting jumbo frames.
- 4xOQs with MTU=10 KiB+12xOQs with MTU=2 KiB for a total of 16 virtual lanes. This could enable multiple OQs per pause class for better traffic segregation.

Pointer Reorder Buffers (PROB) can be used where response data from SFSS 550 is placed into a memory pool, and the locations (within the pool) can be chosen by an allocator (e.g., allocator 304 (FIG. 3)) which attempts to keep the banks balanced while avoiding bank conflicts. An allocator can choose locations of memory pool pointers to send to the PROBs for the destination OQs, and the pointers are reordered by PROBs to their corresponding position. In some examples, resolving conflicts in the PROB when multiple of the incoming flits are directed to the same PROB can occur by implementing duplicated memories which allows pointers to be written concurrently to the PROB.

JT check 526 can enforce a buffering policy for the OQs (e.g., SAF or VCT). In some examples, JT check 526 can enforce a JT level for a particular MTU size to reduce latency for certain categories of packets (e.g., mice flows) in a particular OQ. In some examples, elephant MTU size can be larger or much larger than Mice MTU size and the JT level for a queue can be less than or equal to MTU size. Accordingly, an elephant JT level can be much larger than a Mice JT level. In some examples, a JT level can be less than or equal to MTU size. However, elephant JT level can be less than Mice JT level.

JT check 526 can prevent a HOL packet in a ROB from being eligible for egress until the currently configured JT value has been met. In some examples, a JT check 526 is applied per OQ, but in other examples, a JT check 526 is applied for multiple different OQ but applies OQ-specific JT levels. JT check 526 can prevent packet underrun, e.g., enforcing the JT value can ensure that the probability of underrun is not higher than a target probability given an SFSS latency profile. At least three types of JT level conditions can be supported.

- A JT level can specify the number of consecutive packet segments, starting from the head of packet segment, that may have landed in ROB 524. Once all the JT segments have landed in ROB 524, or once the complete packet is stored in the ROB (if packet size is smaller than the JT level), the packet becomes eligible for egress.
- A JT level can specify a time period, which starts being measured when the head of packet segment lands in ROB 524. Once the time period has elapsed, or once the complete packet is stored in ROB 524, the packet becomes eligible for egress.
- A JT level can be a mixture of landed segments and elapsed time. Again, once the JT level is met, or the complete packet is stored in ROB 524, the packet becomes eligible for egress. Different JT values can result in different OQ buffering policies for different packet sizes.

For example, an OQ can operate in VCT-mode for packet sizes that are larger than the configured JT value. For example, an OQ can operate in SAF-mode for packet sizes that are smaller than the configured JT value. For example, an OQ can operate in SAF-mode when a configured JT is equal to or larger than an MTU for the OQ (e.g., the depth of the OQ is larger than or equal to the MTU). Note that in some cases, SAF-mode guarantees 0% underrun probability. A maximal latency imposed by the JT enforcing mechanism can be suffered at most once per burst of packets, without generating bubbles between packets after being suffered once.

JT adaptation 528 can perform adaptation of the JT level to be used by JT check 526, based at least on a current value of the SFSS load level indication 570. This scheme allows for the switch latency to be optimized while honoring the target underrun probability, and to efficiently react to exceptional cases. Note that both the JT configured value and the adaptation may be dependent on the port speed (if the port speed is configurable). Adaptation can operate in at least two ways. For example, adaptation may choose from a set of multiple pre-configured JT values or levels ($L_1 \ldots L_{Njt}$) or adaptation may generate the JT value from pre-configured generation rule, with pre-configured parameters for the rule. In some examples, fetch scheduler 514 may set or force a specific JT value for any of the associated OQs (e.g., select one from the set of available JT values for the OQ). Fetch scheduler 514 may force a specific JT level to be used for the OQs, based on internal state (e.g., incast degree, packet drop rate on Packet Tx Pipeline 530, etc.) to modify an objective (e.g., instead of optimizing latency, optimizing output port bandwidth utilization). JT adaptation 528 may accept a forcing signal from fetch scheduler 514, forcing it to stop adapting and select the JT value indicated by the forcing signal.

Some example scenarios of adaptive latency reduction are as follows. During VCT-mode operation of an OQ, SFSS 550 interface overspeed can be used to fetch the header for each and every packet at faster than line-rate speed while the reminder of the packet could be fetched at line rate. An adaptively selected JT level for an OQ can be set to a small value by JT adaptation block 528 while still preventing underrun. Therefore, the exposed latency for packets in the OQ can be reduced by a faster pass by JT check 526, and reduced JT value.

During VCT-mode operation of multiple OQs, SFSS interface overspeed can be used to fetch more than one VCT packets (destined to distinct OQs) simultaneously. Because VCT packets may not always be fetched with overspeed (e.g., if the packet reception in the switch is not finished yet), spare overspeed can be used to fetch SAF packets at sub-line-rate.

When SFSS load level 570 is high, fetch scheduler 514 may force SAF-mode of the destination OQs, and downgrade the fetch rate to be lower than line rate. The forcing of SAF-mode for the OQs can attempt to avoid packet underrun while fetching slowly. After load on SFSS 550 stabilizes, the adaptive fetch rate mechanism in fetch scheduler 514 can increase fetch rate and un-force the SAF-mode.

Packet Transmit Pipeline (PTP) 530 can pull packet segments from OQs (ROB 524), perform any egress-side packet processing, and egresses the packets through the associated output port. Packet segments can be pulled from an OQ when the OQ's head of line (HOL) packet has complied with the JT check, e.g., only when the HOL packet is eligible for egress. In some examples, a header can be pulled and processed when it is fully stored in the H-ROB or a packet is eligible for egress when its header has been processed and the JT level for its body (B-ROB) has been reached. Although not shown in FIG. 5, other scheduling and packet processing processes my occur within PTP 530.

Egress scheduler 532 can schedule packet egress order from a port by choosing a packet from a set of head-of-line packets from one or multiple OQs (e.g., OQs may have no ordering dependencies between them). Eligibility conditions for a packet to be scheduled for egress can be the holding OQ is not paused (e.g., by flow control) and the required packet segments (including header segments) have landed in the corresponding ROBs (H-ROB and B-ROB). Egress scheduler 532 can copy (e.g., pull) the header segments for the scheduled packets, and provide the header segments for processing by header processing 534. In some examples, egress scheduler 532 can re-prioritize egress order (e.g., select a different order) with regard to the ordering chosen by fetch scheduler 514. For example, egress scheduler 532 can specify a packet egress order from multiple OQs corresponding to virtual lanes that differs from packet fetch order (e.g., to allow mice flows to jump ahead of elephant flows). This capability allows for reprioritizing traffic based on exposed fabric latency and the type of traffic (e.g., mice versus elephant flows).

Header processing 534 can perform egress-side processing of the packet header (e.g., header modification, encapsulation, de-encapsulation, etc.). As long as a buffer between header processing 534 and Tx control 536 is able to segregate traffic on a per OQ basis, egress scheduler 532 can start fetching packet headers as soon as they have arrived in the corresponding OQ's H-ROB. Thus, the header may be processed while hiding the latency of a time taken for the packet's body to arrive at the corresponding OQ's B-ROB. In some embodiments, latency hiding of egress-side packet processing can process headers of a packet during egress of body of another packet to attempt to hide latency of body buffering. The processed header can be forwarded to the transmit (Tx) control 536, with some buffering included for modified headers (e.g., enough to sustain egress bandwidth and avoid bubbles due to header processing). Tx control 536 can receive processed headers, and initiate packet egressing procedure for them. For each new processed header for which its packet is permitted to egress, Tx control 536 can retrieve body segments (through egress scheduler 532, which follows scheduled packet order and the OQ mapping).

Tx control 536 can also receive and process flow control indications for the port, and forward the necessary indications to both schedulers. A per-OQ stall indication can be sent to fetch scheduler 514 based on receipt of the flow control signal. For example, a per-OQ stall indication can be sent to egress scheduler 532 as soon as the flow control starts being in effect.

Some example scenarios of traffic segregation and latency hiding are as follows. Flows with similar traffic profiles can be grouped and mapped into distinct OQs. For example, mice flows can be grouped into distinct OQs, elephant flows can be grouped into distinct OQs and mid-sized flows can be grouped into distinct OQs. These OQs could be configured with distinct MTUs corresponding to the maximum expected packet size in the traffic profile for the group of flows. If a large packet in one flow arrives at the switch earlier than a small packet in a distinct flow, fetch scheduler 514 can schedule the large packet for fetching first, and then the small packet. The set of final segments of the large packet are likely to arrive at their OQ later than the time at which the segments of the small packets arrive at their OQ (e.g., a distinct OQ). Egress scheduler 532 can schedule small packets to egress first, thus avoiding the long wait for the large packet to completely land in its OQ, and completely egress through the port.

In response to receipt of a flow control indication at an output port, a stall signal can be generated for each of the OQs paused by the flow control criterion. These stall signals can be forwarded to PFSFAC 510 and used by PTP 530 to stop pulling segments for new packets from the paused OQ. PFSFAC 510 may use this indication to stop fetching new packet for the paused OQs, to force the paused OQ to SAF-mode operation (JT force), and to re-allocate SFSS bandwidth to other OQs after the paused OQ is configured to SAF-mode.

Figure 6:
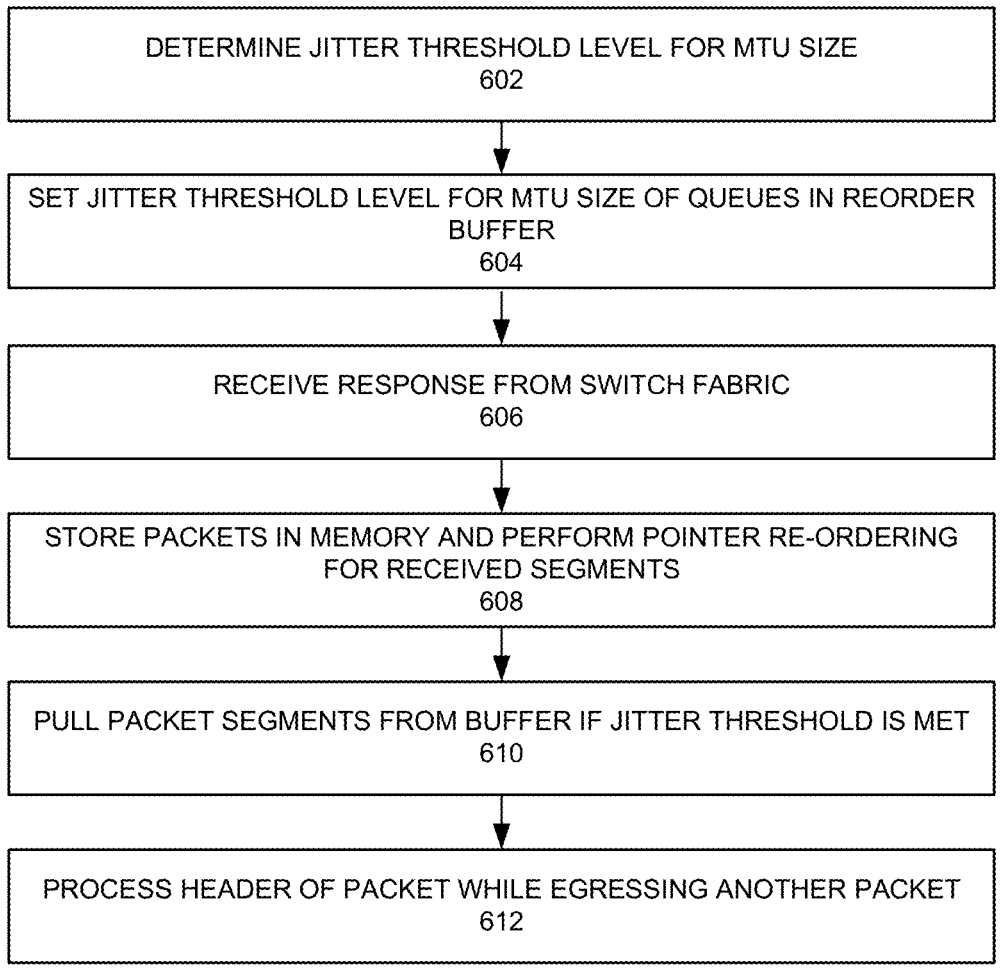
FIG. 6 depicts a process.

FIG. 6 depicts a process. The process can be performed in a switch or network interface by an egress system for an egress port. At 602, the process can determine a jitter threshold level for an MTU size. A jitter threshold level can indicate a number of contiguous head-of-packet segments for a ROB's head of line (HOL) packet that are to be in the ROB before the packet is allowed to start egressing. For example, an MTU size can correspond to a mouse flow, medium size flow, or elephant flow. The particular thresholds that define mouse, medium, or elephant flow can be set by a network administrator in some examples.

At 604, the process can set a jitter threshold level for output queues of a reorder buffer (ROB). For example, a ROB can be allocated to store header or payload of packets associated with one or more traffic classes. A ROB can have an associated header-ROB (H-ROB) to store a portion of a header of a packet and a body-ROB (B-ROB) to store a portion of a body of a packet. In some examples, an H-ROB can store an associated pointer to a header portion in a memory pool and a B-ROB can store an associated pointer to a body portion in a memory pool. The jitter threshold level can be set for any OQ associated with a particular MTU size.

At 606, the process receives a response from a switch fabric. The response can include packet data (e.g., header or body) and an identifier based on a packet retrieval request made to the switch fabric. The response can be received in response to a packet fetch request. At 608, the process stores portions of the response into a memory pool and provides pointers to data and header in the memory pool that can be used for reordering packet portions. At 608, the process performs pointer re-ordering to reorder pointers so that packet header and body segments are arranged in order to re-create the packet prior to processing and egress. In some examples, one or more pointer reorder buffers (P-ROBs) can be used to reorder pointers for header and body portions.

At 610, the process permits pulling of packet segments from a particular ROB if a jitter threshold level for the particular ROB is met. For example, a jitter threshold level for headers of mouse flows can be set to a lower value than a jitter threshold level for headers of elephant flows to allow header pulling by egress scheduler 532 and processing to occur sooner for mouse flows than for elephant flows. At 612, the process performs header processing of a packet while egressing a body portion of another packet. Egressing a prior packet can include transmitting a body portion of another packet from an egress port. Header processing can include egress-access control list (ACL) checking, encapsulation, de-encapsulation, in-band telemetry data insertion, and so forth. Header processing of a packet while transmitting another packet can hide latency associated with buffering body segments of a packet.

Figure 7:
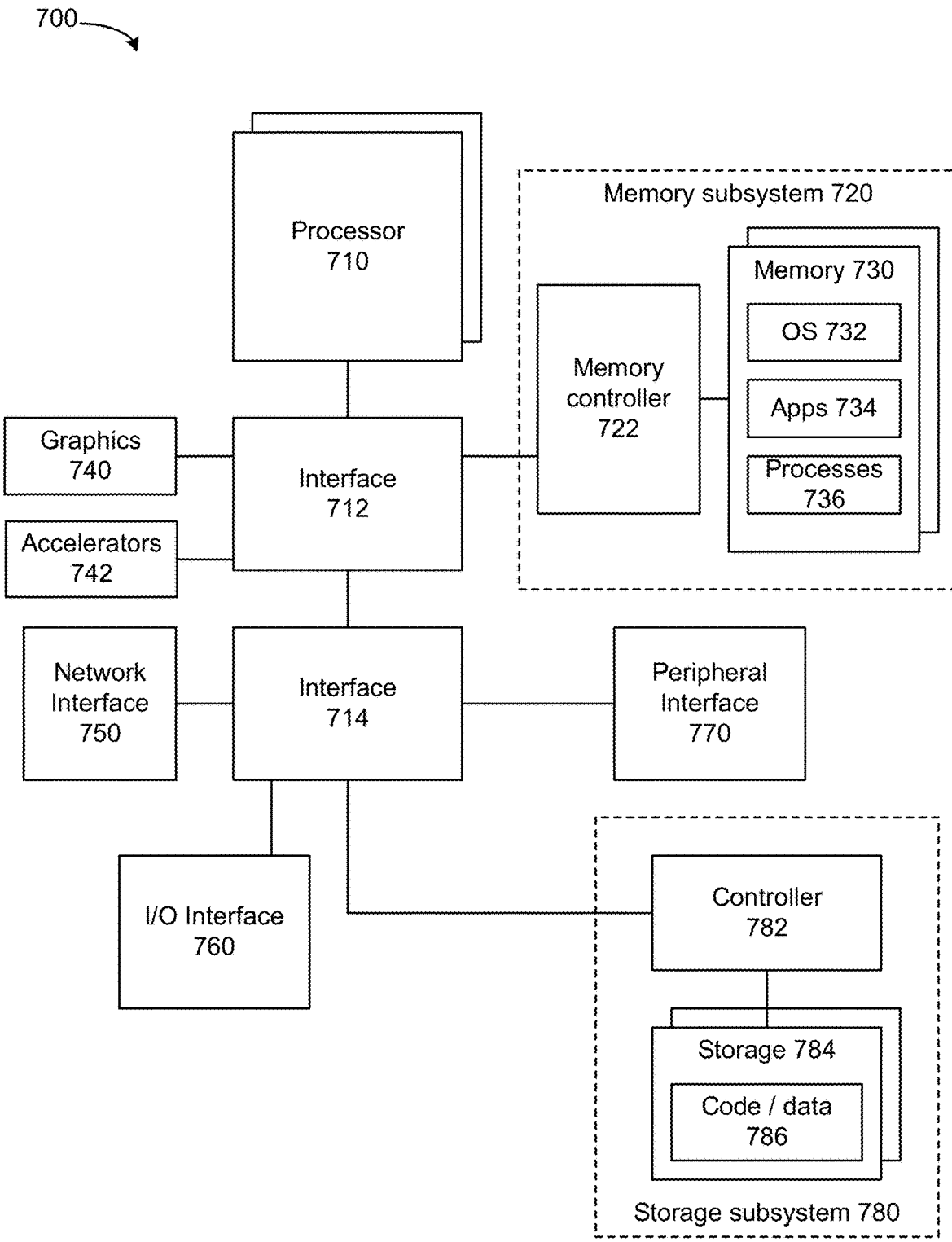
FIG. 7 depicts an example system.

FIG. 7 depicts a system. The system can use embodiments described herein to control operation of an egress subsystem. System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a fixed function or programmable offload engine that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 742 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue memory commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory. Network interface 750 can receive data from a remote device, which can include storing received data into memory. Various embodiments can be used in connection with network interface 750, processor 710, and memory subsystem 720. Various embodiments of network interface 750 use embodiments described herein to receive or transmit timing related signals and provide protection against circuit damage from misconfigured port use while providing acceptable propagation delay.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (e.g., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (e.g., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory uses refreshing the data stored in the device to maintain state. One example of dynamic volatile memory includes DRAM (Dynamic Random Access Memory), or some variant such as Synchronous DRAM (SDRAM). An example of a volatile memory include a cache. A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet, part of the Internet, public cloud, private cloud, or hybrid cloud. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Figure 8A:
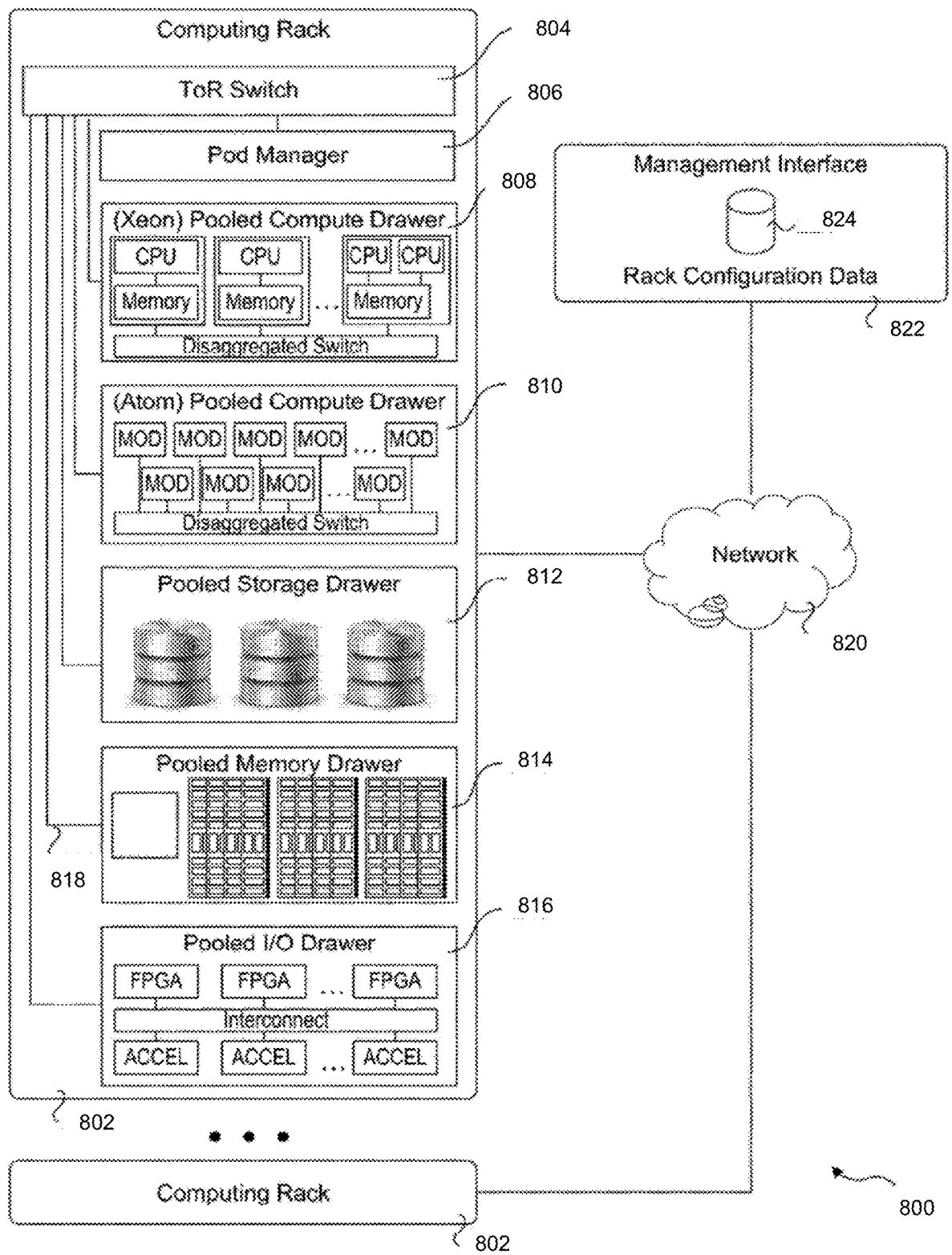
FIG. 8A depicts an environment

FIG. 8A depicts an environment 800 includes multiple computing racks 802, each including a Top of Rack (ToR) switch 804, a pod manager 806, and a plurality of pooled system drawers. The environment can use switch fabric or egress subsystem embodiments described herein. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® Xeon® processor pooled computer drawer 808, and Intel® ATOM™ processor pooled compute drawer 810, a pooled storage drawer 812, a pooled memory drawer 814, and a pooled I/O drawer 816. Each of the pooled system drawers is connected to ToR switch 804 via a high-speed link 818, such as a 40 Gigabit/second (Gb/s) or 100 Gb/s Ethernet link or a 100+Gb/s Silicon Photonics (SiPh) optical link. In one embodiment high-speed link 818 comprises an 800 Gb/s SiPh optical link.

Multiple of the computing racks 802 may be interconnected via their ToR switches 804 (e.g., to a pod-level switch or data center switch), as illustrated by connections to a network 820. In some embodiments, groups of computing racks 802 are managed as separate pods via pod manager(s) 806. In one embodiment, a single pod manager is used to manage all of the racks in the pod. Alternatively, distributed pod managers may be used for pod management operations.

Environment 800 further includes a management interface 822 that is used to manage various aspects of the environment. This includes managing rack configuration, with corresponding parameters stored as rack configuration data 824. In an example, environment 800 can be implemented using interconnected compute sleds of processors, memories, storages, network interfaces, and other components.

Figure 8B:
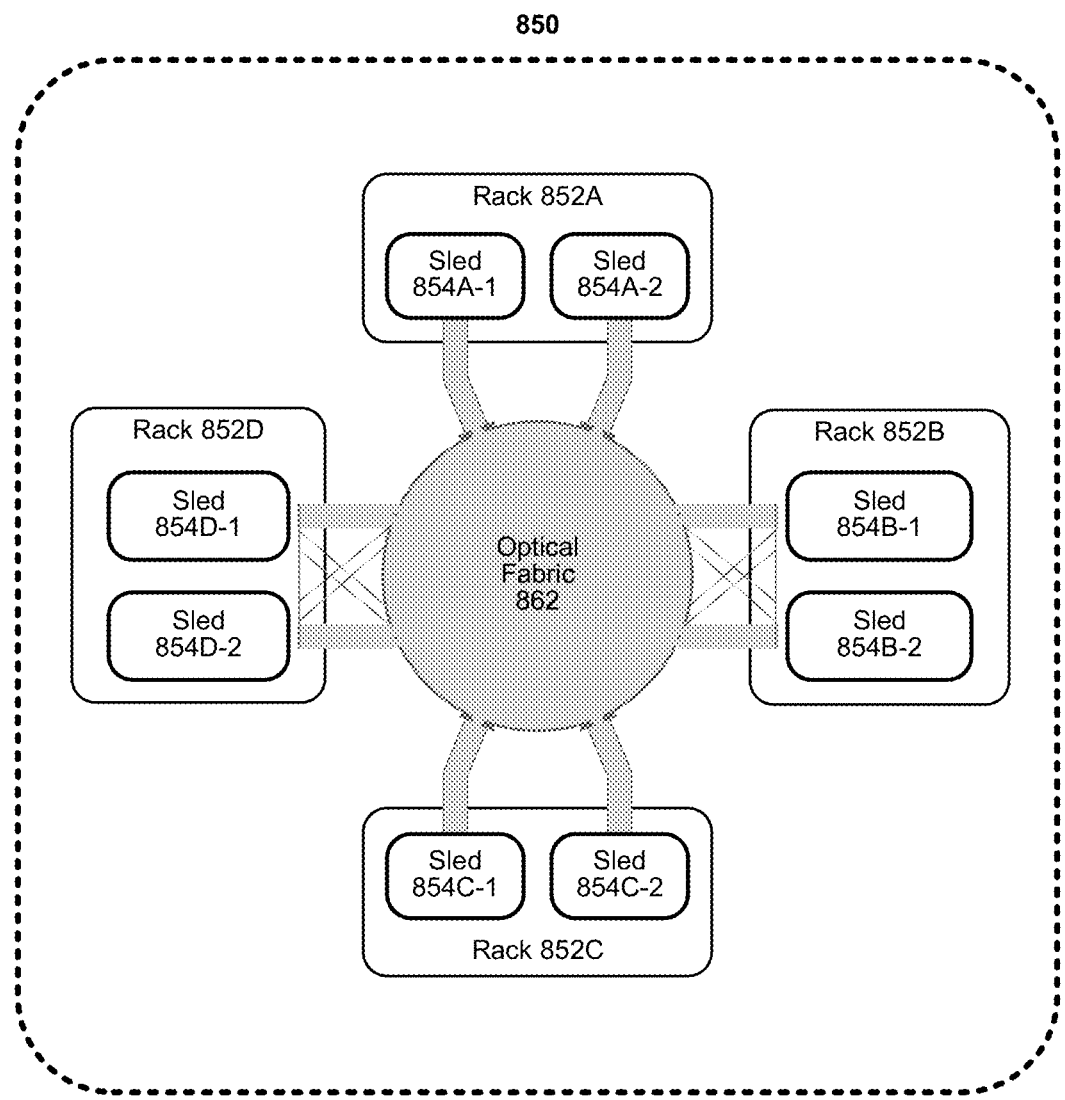
FIG. 8B depicts an example data center.

FIG. 8B depicts an example of a data center. Various embodiments of the switch fabric or egress subsystem can be used in or with the data center of FIG. 8B. As shown in FIG. 8B, data center 850 may include an optical fabric 862. Optical fabric 862 may generally include a combination of optical signaling media (such as optical cabling) and optical switching infrastructure via which any particular sled in data center 850 can send signals to (and receive signals from) the other sleds in data center 850. However, optical, wireless, and/or electrical signals can be transmitted using fabric 862. The signaling connectivity that optical fabric 862 provides to any given sled may include connectivity both to other sleds in a same rack and sleds in other racks. Data center 850 includes four racks 852A to 852D and racks 852A to 852D house respective pairs of sleds 854A-1 and 854A-2, 854B-1 and 854B-2, 854C-1 and 854C-2, and 854D-1 and 854D-2. Thus, in this example, data center 850 includes a total of eight sleds. Optical fabric 862 can provide sled signaling connectivity with one or more of the seven other sleds. For example, via optical fabric 862, sled 854A-1 in rack 852A may possess signaling connectivity with sled 854A-2 in rack 852A, as well as the six other sleds 854B-1, 854B-2, 854C-1, 854C-2, 854D-1, and 854D-2 that are distributed among the other racks 852B, 852C, and 852D of data center 850. The embodiments are not limited to this example. For example, fabric 862 can provide optical and/or electrical signaling.

Figure 9:
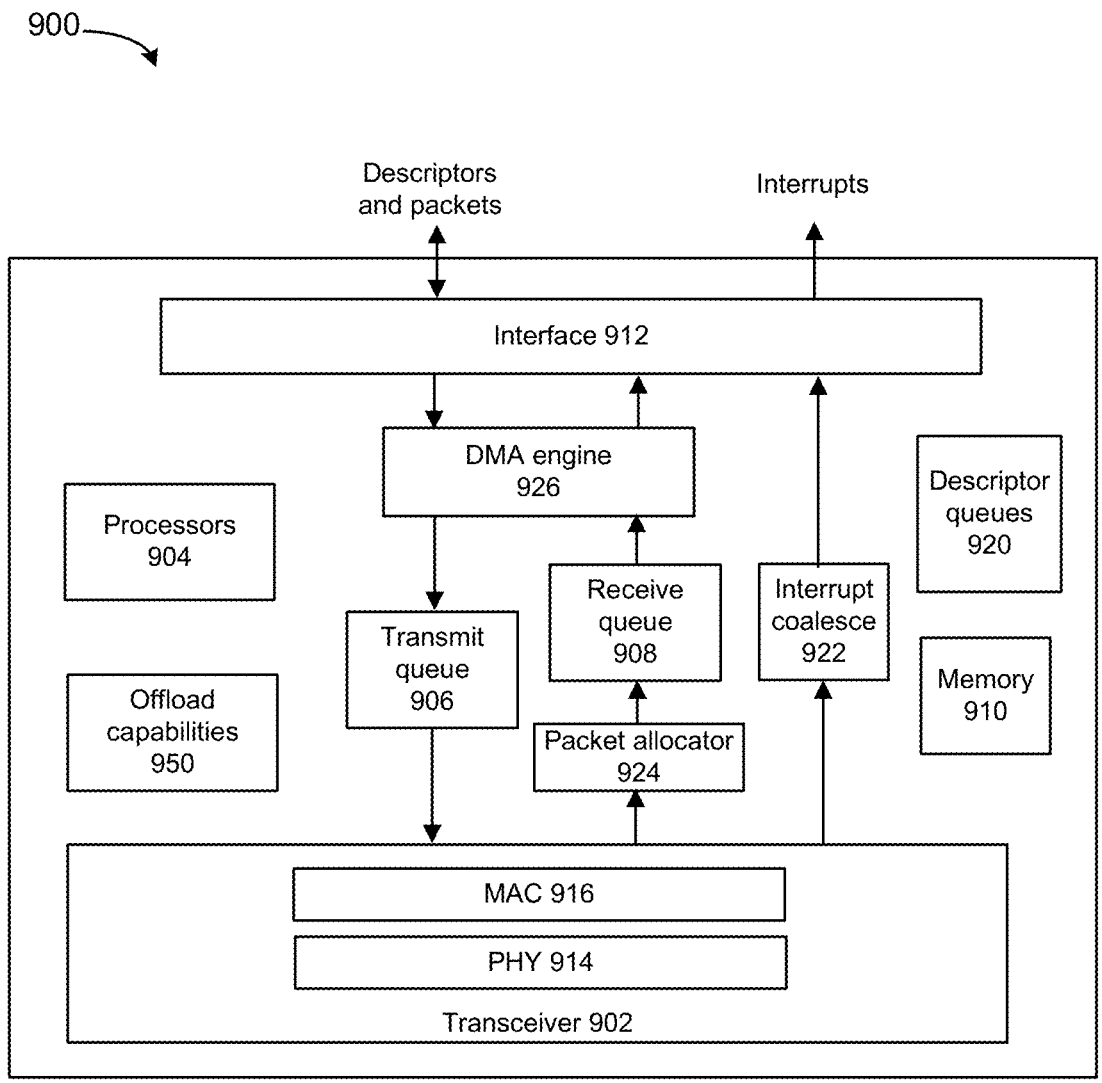
FIG. 9 depicts an example network interface.

FIG. 9 depicts a network interface that can use embodiments or be used by embodiments. The network interface can use embodiments described herein in connection with a switch fabric or egress subsystem. In some examples, network interface 900 can be implemented as a network interface controller, network interface card, a host fabric interface (HFI), host bus adapter (HBA). Network interface 900 can be coupled to one or more servers using a bus, PCIe, CXL, or DDR. Network interface 900 may be embodied as part of a system-on-a-chip (SoC) that includes one or more processors, or included on a multichip package that also contains one or more processors.

Network interface 900 can include transceiver 902, processors 904, transmit queue 906, receive queue 908, memory 910, and bus interface 912, and DMA engine 926. Transceiver 902 can be capable of receiving and transmitting packets in conformance with the applicable protocols such as Ethernet as described in IEEE 802.3, although other protocols may be used. Transceiver 902 can receive and transmit packets from and to a network via a network medium (not depicted). Transceiver 902 can include physical layer (PHY) circuitry 914 and media access control (MAC) circuitry 916. PHY circuitry 914 can include encoding and decoding circuitry (not shown) to encode and decode data packets according to applicable physical layer specifications or standards. MAC circuitry 916 can be configured to assemble data to be transmitted into packets, that include destination and source addresses along with network control information and error detection hash values. MAC circuitry 916 can be configured to process MAC headers of received packets by verifying data integrity, removing preambles and padding, and providing packet content for processing by higher layers.

Processors 904 can be any a combination of a: processor, core, graphics processing unit (GPU), field programmable gate array (FPGA), application specific integrated circuit (ASIC), or other programmable hardware device that allow programming of network interface 900. For example, processors 904 can provide for allocation or deallocation of intermediate queues. For example, a "smart network interface" can provide packet processing capabilities in the network interface using processors 904.

Packet allocator 924 can provide distribution of received packets for processing by multiple CPUs or cores using timeslot allocation described herein or RSS. When packet allocator 924 uses RSS, packet allocator 924 can calculate a hash or make another determination based on contents of a received packet to determine which CPU or core is to process a packet.

Interrupt coalesce 922 can perform interrupt moderation whereby network interface interrupt coalesce 922 waits for multiple packets to arrive, or for a time-out to expire, before generating an interrupt to host system to process received packet(s). Receive Segment Coalescing (RSC) can be performed by network interface 900 whereby portions of incoming packets are combined into segments of a packet. Network interface 900 provides this coalesced packet to an application.

Direct memory access (DMA) engine 926 can copy a packet header, packet payload, and/or descriptor directly from host memory to the network interface or vice versa, instead of copying the packet to an intermediate buffer at the host and then using another copy operation from the intermediate buffer to the destination buffer. In some examples, DMA engine 926 can perform writes of data to any cache such as by using Data Direct I/O (DDIO).

In some examples, network interface 900 can include offload capabilities 950 to perform one or more of: large receive offload (LRO), large send/segmentation offload (LSO), TCP segmentation offload (TSO), Transport Layer Security (TLS) offload, receive side scaling (RSS) to allocate a queue or core to process a payload. LRO can include reassembling incoming network packets and transfer packet contents (e.g., payloads) into larger contents and transferring the resulting larger contents but fewer packets for access by the host system or a VEE. LSO can include generating a multipacket buffer and providing content of the buffer for network interface 900 to split into separate packets for transmission. TLS is defined at least in The Transport Layer Security (TLS) Protocol Version 1.3, RFC 8446 (August 2018). TLS offload can refer to offload of encryption or decryption of contents in accordance with TLS in network interface 900. In some examples, any type of encryption or decryption be performed by network interface 900 such as but not limited to Secure Sockets Layer (SSL).

Memory 910 can be any type of volatile or non-volatile memory device and can store any queue or instructions used to program network interface 900. Transmit queue 906 can include data or references to data for transmission by network interface. Receive queue 908 can include data or references to data that was received by network interface from a network. Descriptor queues 920 can include descriptors that reference data or packets in transmit queue 906 or receive queue 908. Bus interface 912 can provide an interface with host device (not depicted). For example, bus interface 912 can be compatible with peripheral connect Peripheral Component Interconnect (PCI), PCI Express, PCI-x, Serial ATA (SATA), and/or Universal Serial Bus (USB) compatible interface (although other interconnection standards may be used).

Figure 10:
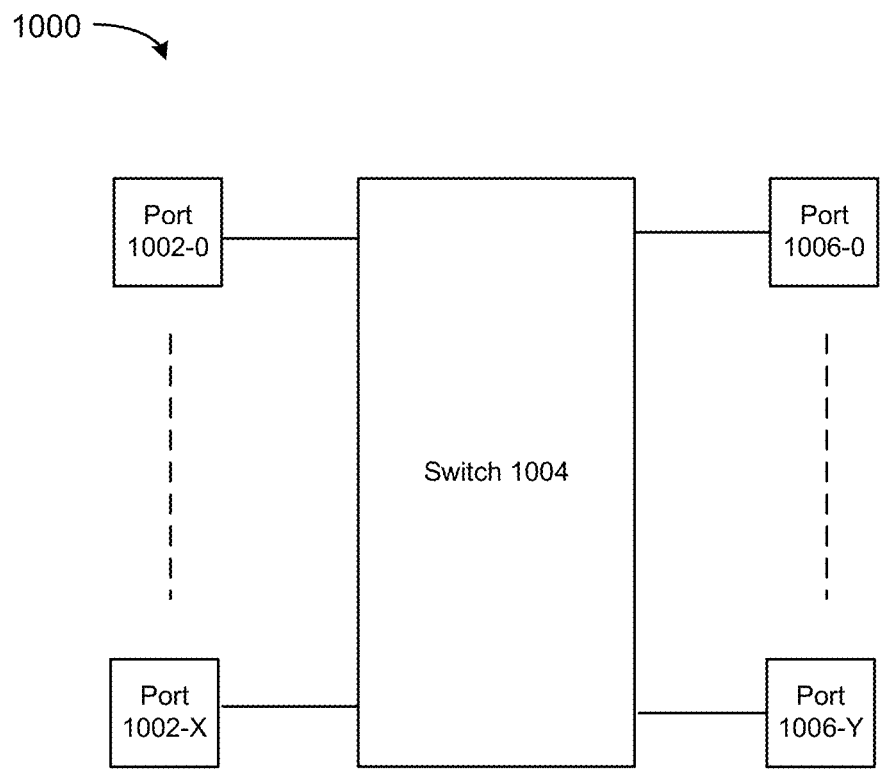
FIG. 10 depicts an example switch.

FIG. 10 depicts an example switch. Various embodiments can use embodiments described herein in connection with a switch fabric or egress subsystem. Switch 1004 can route packets or frames of any format or in accordance with any specification from any port 1002-0 to 1002-X to any of ports 1006-0 to 1006-Y (or vice versa). Any of ports 1002-0 to 1002-X can be connected to a network of one or more interconnected devices. Similarly, any of ports 1006-0 to 1006-X can be connected to a network of one or more interconnected devices. Switch 1004 can decide which port to transfer packets or frames to using a table that maps packet characteristics with an associated output port. For example, match-action tables can be used whereby a hash of a portion of a packet is used as an index to find an entry. In addition, switch 1004 can perform packet replication for forwarding of a packet or frame to multiple ports and queuing of packets or frames prior to transfer to an output port. Some embodiments implement hash-lookup in P4 programming language, which is a programming language designed to allow programming of packet forwarding in data-planes. In contrast to general purpose language such as C or python, P4 is domain-specific language with a number of constructs optimized around network data forwarding.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes an egress port management apparatus including: a packet re-order buffer (ROB) and an egress scheduler to decide egress ordering for packets in the packet ROB, wherein based on reception of a flow control message, the egress scheduler is to pause egress of packets in a flow associated with the flow control message from an egress port by halting packet egress scheduling for packets corresponding to a flow associated with flow control from a time of reception of a flow control message until a time when flow control stops.

Example 2 includes any example and includes a transmit controller to control transmission of a packet from the ROB based on packet segment state, the transmit control to react to the flow control message by: permit segments in the flow in a transmit state to be output from the ROB, permit in-flight packet segments in the flow before a flow control reaction deadline expires to be output from the ROB, and do not schedule egress of a packet segment corresponding to a flow associated with the flow control message.

Example 3 includes any example and includes a packet replay control to track a state of a packet segment request, wherein a state comprises: packet is waiting to be scheduled for egress, packet has been scheduled for egress and its fetching has started but packet has not started transmission yet, or packet has started transmission.

Example 4 includes any example, wherein based on end of flow control, the packet replay control is to prioritize re-played requests for fetching from a switch fabric.

Example 5 includes any example, wherein: the egress scheduler is to notify the packet replay control which packet descriptors have been scheduled for egress to trigger a transition to in-flight state, the transmit controller is to notify the packet replay control which packet descriptors have had transmission initiated, in order to trigger transition to a transmit state, and the transmit controller is to notify the packet replay control that egress of a packet is complete to cause deallocation of packet segment pointers.

Example 6 includes any example, wherein: the ROB is shared across multiple flows, the ROB comprises a header-ROB (H-ROB) and a body-ROB (B-ROB), a depth of the ROB and pause of the ROB at least, in part, allow the flow to be non-blocking of another flow, the ROB is to receive an out-of-order packet segment from a switch fabric and the ROB is to reorder the segments of a packet, and a depth of the ROB is bounded to be drainable within a pause control reaction deadline in accordance with an egress port transmit rate.

Example 7 includes any example, wherein the ROB comprises a header-ROB (H-ROB) and a body-ROB (B-ROB) and comprising a jitter threshold enforcement device to apply a time or segment threshold for output from the B-ROB and header processing logic to process a header from the H-ROB and wherein the header processing logic is to retrieve a header before a jitter threshold for a body associated with the header is met.

Example 8 includes any example, wherein the ROB is to drop packet segments corresponding to packets that were in an in-flight state at expiration of a flow control reaction deadline.

Example 9 includes any example, wherein a depth of the ROB is large enough to hold, at least, enough packet segments to cover a target maximum switch response latency when egressing segments at line rate and maximum allowed pause reaction time for all in-flight packets to be egressed before the pause reaction time expires.

Example 10 includes any example, and includes a jitter-threshold (JT) checker to specify a minimum number of head-of-packet segments that can be buffered to allow a packet to commence egress.

Example 11 includes any example, wherein the JT checker is to cause the ROB to operate in virtual cut through mode when a configured jitter threshold is smaller than a maximum transmission unit for a port.

Example 12 includes any example, wherein the JT checker is to cause the ROB to operate in store and forward mode when a configured jitter threshold is equal or larger than the maximum transmission unit for an output port.

Example 13 includes any example, and includes at least one egress port coupled to the egress scheduler.

Example 14 includes any example, and includes a switch fabric coupled to the egress scheduler.

Example 15 includes any example, and includes at least one of a server, rack, blade, or data center.

Example 16 includes a method comprising: for a packet requested to be fetched from a fabric for egress from a port, storing a packet descriptor that indicates progress of a packet egress, wherein the progress indicates one or more of waiting, in-flight, or transmit; setting a progress to waiting prior to commencement of a fetch for a packet portion; updating the progress based on a change in status from waiting to in-flight based on commencement of the fetch for the packet portion; and updating the progress based on a change in status from in-flight to transmit based on commencement of a transmit of a packet portion.

Example 17 includes any example, and includes based on receipt of a flow control request for a flow: changing a state of a packet segment of the flow that is in an in-flight state when an flow control reaction deadline expires into a waiting state; permitting a packet in the flow that is in an in-flight state before a flow control reaction deadline expires to be egressed from an output queue, and not permitting scheduling of transmission of a packet in the flow that is in a waiting state.

Example 18 includes any example, and includes processing a header from a header queue by pulling headers before a jitter threshold for an associated body is complied with.

Example 19 includes any example, and includes providing a jitter threshold for body segments of packet by waiting for a minimum number of head-of-packet segments to be buffered to allow egress of a packet to start.

Example 20 includes a system comprising: a switch fabric; an ingress port to the switch fabric; and an egress system from the switch fabric, the egress system comprising an egress port and the egress system comprising: an output data re-order buffer (ROB) that is shared across multiple flows and a transmit controller to control transmission of a packet from the ROB, the transmit controller to react to a flow control request for a flow by: permit segments in the flow in a transmit state to be output from the ROB, permit in-flight packet segments in the flow before a flow control reaction deadline expires to be output from the ROB, and do not schedule egress of a packet segment in the flow that is in a waiting state.

Example 21 includes any example, wherein the switch fabric comprises a shared memory switch fabric.

Example 22 includes any example, wherein: the ROB is shared across multiple flows, the ROB comprises a header-ROB (H-ROB) and a body-ROB (B-ROB), a depth of the ROB and pause of the ROB at least, in part, allow the flow to be non-blocking of another flow, the ROB is to receive an out-of-order packet segment from a switch fabric and the ROB is to reorder the segments of a packet, and a depth of the ROB is bounded to be drainable within a pause control reaction deadline in accordance with an egress port transmit rate.

Example 23 includes any example, wherein the egress system is to: based on end of flow control, prioritize re-allocated requests for fetching from a switch fabric.

Example 24 includes a method comprising: allowing a packet to start egressing at expiration of a timer that starts at a time of issuance of a first read request for first segment of a packet, wherein the segment comprises a header.

Example 25 includes a method comprising: allowing a packet to start egressing based on meeting a threshold number of contiguous head-of-packet segments for a segment reorder buffer's head of line (HOL) packet that are to be in the segment reorder buffer or meeting a threshold number of contiguous head-of-packet segments for a segment reorder buffer's head of line (HOL) packet that are to be in the segment reorder buffer.

Example 26 includes an egress port management apparatus in combination with any other claim and comprising: an output data re-order buffer (ROB) for at least one traffic class and transmit control to control transmission of a packet from the ROB and jitter selection logic to receive a specified adaptive jitter threshold level for the output data ROB, wherein the jitter threshold level indicates a number of contiguous head-of-packet segments for a ROB's head of line (HOL) packet that are to be in the ROB before the packet is allowed to start egressing and/or is based on expiration of a timer that starts at a time of issuance of a first read request for first segment of a packet, wherein the segment comprises a header.

Example 27 includes any example and an egress port management apparatus comprising: an adaptive jitter selector to apply a jitter threshold level for a buffer, wherein the jitter threshold level is to indicate when egress of a packet segment from the buffer is allowed, wherein the packet segment comprises a packet header and wherein the jitter threshold level is adaptive based at least in part on a switch fabric load.

Example 28 includes any example, wherein the jitter threshold level is to indicate a number of segments for the buffer's head of line (HOL) packet that are to be in the buffer or indicate a timer that is based on a time of issuance of a first read request for a first segment of the packet in the buffer.

Example 29 includes any example, wherein: the jitter threshold level is not more than a maximum transmission unit (MTU) size associated with the buffer.

Example 30 includes any example, and includes a fetch scheduler to adapt an amount of interface overspeed to reduce packet fetching latency while attempting to prevent fabric saturation based on a switch fabric load level, wherein the fetch scheduler is to control the jitter threshold level for the buffer by forcing the jitter threshold level based on switch fabric load level and latency profile of the switch fabric.

Example 31 includes any example, and includes a second buffer, wherein: the jitter threshold level for the buffer is not more than a maximum transmission unit (MTU) size associated with the buffer, the jitter threshold level for the second buffer is not more than a MTU size associated with the second buffer, a size of the buffer is larger than the MTU size associated with the buffer, a size of the second buffer is larger than the MTU size associated with the second buffer, the buffer is prohibited from storing a packet larger than its MTU size, the second buffer is prohibited from storing a packet larger than its MTU size, and the MTU size for the buffer is independent from the MTU size for the second buffer.

Example 32 includes any example, wherein the buffer comprises a header reorder buffer (H-ROB) to store a portion of a packet header and a body reorder buffer (B-ROB) to store a portion of a packet body and wherein an H-ROB or B-ROB is to store and re-order pointers to packet segments stored in a memory pool.

Example 33 includes any example, and includes a header processor to receive a header portion from the buffer, wherein the header processor is to attempt to process a header of a first packet during streaming out of a body of a second packet.

Example 34 includes any example, and includes an egress pipeline to provide pop, peek or rewind signals to enable reading a same packet multiple times and an output queue state processor to receive credit returns from the buffer as packet segments are pulled for transmission and space is available in a memory pool.

Example 35 includes any example, wherein the buffer is to operate in a virtual cut through (VCT)-mode when a configured jitter threshold level is smaller than a maximum transmission unit (MTU) for the buffer of a port or operate in a store and forward (SAF) mode when a configured jitter threshold level is equal to or larger than the MTU for the buffer for the port.

Example 36 includes any example, and includes a method comprising: setting a jitter threshold level for a reorder buffer (ROB), wherein the jitter threshold level is adaptive based at least in part on a switch fabric load; storing portions of a response from a switch fabric into memory, wherein the response includes data and an identifier based on a packet retrieval request made to the switch fabric; pulling packet segments from the ROB if the jitter threshold level for the ROB is met, wherein a packet segment comprises a packet header portion; and performing header processing on the packet segments while egressing another packet.

Example 37 includes any example, and includes adapting an amount of overspeed of an interface with the switch fabric to reduce packet fetching latency while attempting to prevent switch fabric saturation, wherein the jitter threshold level for the ROB is set based on switch fabric load level and a latency profile of the switch fabric and the jitter threshold level is no more than a maximum transmission unit (MTU) size associated with the ROB.

Example 38 includes any example, wherein the jitter threshold level is to indicate a number of contiguous segments for the ROB's head of line (HOL) packet that are to be in the ROB or is based on a timer that starts at a time of issuance of a first read request for a first segment of the packet in the ROB.

Example 39 includes any example, wherein header processing includes one or more of: egress-access control list (ACL) checking, encapsulation, de-encapsulation, or in-band telemetry data insertion.

Example 40 includes any example, wherein the jitter threshold level is no more than a maximum transmission unit (MTU) size associated with the ROB and wherein the jitter threshold level for the ROB is based at least in part on one or more of: incast level, packet drop rate in a transmit pipeline, or an objective and wherein the objective comprises one or more of: optimize latency or optimize output port bandwidth utilization.

Example 41 includes any example, wherein the jitter threshold level for the ROB is based at least in part on a number of at-rate packet segments that fit within a worst case target switch fabric latency.

Example 42 includes any example, wherein the ROB operates in a virtual cut through (VCT)-mode when the jitter threshold level is smaller than a maximum transmission unit (MTU) for a port or the ROB operates in a store and forward (SAF) mode when the jitter threshold level is equal-to or larger than the MTU for the port.

Example 43 includes any example, and includes a system comprising: a switch fabric; a memory; and an adaptive jitter selector, wherein the adaptive jitter selector is to: apply a jitter threshold level for an output data buffer in the memory, wherein the jitter threshold level is to indicate when egress of a packet segment from the output data buffer is allowed, wherein the packet segment comprises a packet header and wherein the jitter threshold level is adaptive based on a load of the switch fabric and apply a second jitter threshold level for a second output data buffer in the memory, wherein the second jitter threshold level is to indicate when egress of a packet segment from the second output data buffer is allowed, wherein the second jitter threshold level is adaptive based on a load of the switch fabric.

Example 44 includes any example, wherein the output data buffer comprises a re-order buffer (ROB) and the jitter threshold level is not more than a maximum transmission unit (MTU) size associated with the output data buffer and comprising: a fetch scheduler to adapt an amount of interface overspeed to reduce packet fetching latency while attempting to prevent fabric saturation based on the load of the switch fabric, wherein the fetch scheduler is to control the jitter threshold level for the output data buffer by forcing the jitter threshold level based on the load of the switch fabric and latency profile of the switch fabric.

Example 45 includes any example, wherein the switch fabric comprises a shared memory switch fabric.

Example 46 includes any example, wherein the jitter threshold level is not more than a maximum transmission unit (MTU) size associated with the output data buffer and the second jitter threshold level is not more than a MTU size associated with the second output data buffer.

Example 47 includes any example, and includes a header processor to receive a header portion from the output data buffer or the second output data buffer, wherein the header processor is to attempt to process a header of a first packet during streaming out of a body of a second packet.

What is claimed is:

1. An apparatus comprising:
a switch comprising:
circuitry to apply a jitter threshold level for a buffer, wherein the jitter threshold level is to indicate when egress of a packet segment from the buffer is allowed and wherein the jitter threshold level is adjusted based at least in part on a switch fabric load.

2. The apparatus of claim 1, wherein the jitter threshold level is to indicate a number of segments for the buffer's head of line (HOL) packet that are to be in the buffer and/or indicate a timer that is based on a time of issuance of a first read request for a first segment of the packet in the buffer.

3. The apparatus of claim 1, wherein:
the jitter threshold level is not more than a maximum transmission unit (MTU) size associated with the buffer.

4. The apparatus of claim 3, comprising second circuitry to adjust an amount of interface overspeed to reduce packet fetching latency while attempting to prevent fabric saturation based on a switch fabric load level, wherein the second circuitry is to control the jitter threshold level for the buffer by forcing the jitter threshold level based on switch fabric load level and latency profile of the switch fabric.

5. The apparatus of claim 1, comprising a second buffer, wherein:
the jitter threshold level for the buffer is not more than a maximum transmission unit (MTU) size associated with the buffer,
the jitter threshold level for the second buffer is not more than a MTU size associated with the second buffer,
a size of the buffer is larger than the MTU size associated with the buffer,
a size of the second buffer is larger than the MTU size associated with the second buffer,
the buffer is prohibited from storing a packet larger than its MTU size,
the second buffer is prohibited from storing a packet larger than its MTU size, and
the MTU size for the buffer is independent from the MTU size for the second buffer.

6. The apparatus of claim 1, wherein the buffer comprises a header reorder buffer (H-ROB) to store a portion of a packet header and a body reorder buffer (B-ROB) to store a portion of a packet body and wherein an H-ROB or B-ROB is to store and re-order pointers to packet segments stored in a memory pool.

7. The apparatus of claim 1, comprising:
a processor to receive a header portion from the buffer, wherein the processor is to attempt to process a header of a first packet during streaming out of a body of a second packet.

8. The apparatus of claim 1, comprising:
an egress pipeline to provide pop, peek or rewind signals to enable reading a same packet multiple times and
a processor to receive credit returns from the buffer as packet segments are pulled for transmission and space is available in a memory pool.

9. The apparatus of claim 1, wherein the buffer is to operate in a virtual cut through (VCT)-mode when a configured jitter threshold level is smaller than a maximum transmission unit (MTU) for the buffer of a port or operate in a store and forward (SAF) mode when a configured jitter threshold level is equal to or larger than the MTU for the buffer for the port.

10. The apparatus of claim 1, wherein the switch comprises a switch fabric coupled to the circuitry.

11. The apparatus of claim 1, wherein the jitter threshold level for the buffer is to indicate a number of packet segments that are present in the buffer before a packet associated with the packet segments is to egress.

12. The apparatus of claim 1, wherein the buffer comprises a re-order buffer (ROB) for use to reorder packet segments.

13. A system comprising:
a switch fabric;
a memory; and circuitry, wherein the circuitry is to:
apply a jitter threshold level for an output data buffer allocated in the memory, wherein the jitter threshold level is to indicate when egress of a packet segment from the output data buffer is allowed, and wherein the jitter threshold level is adjusted based on a load of the switch fabric and apply a second jitter threshold level for a second output data buffer in the memory, wherein the second jitter threshold level is to indicate when egress of a packet segment from the second output data buffer is allowed and wherein the second jitter threshold level is adjusted based on a load of the switch fabric.

14. The system of claim 13, wherein the output data buffer comprises a re-order buffer (ROB) and the jitter threshold level is not more than a maximum transmission unit (MTU) size associated with the output data buffer and comprising:
second circuitry to adjust an amount of interface overspeed to reduce packet fetching latency while attempting to prevent fabric saturation based on the load of the switch fabric, wherein the second circuitry is to control the jitter threshold level for the output data buffer based on the load of the switch fabric and latency profile of the switch fabric.

15. The system of claim 13, wherein the switch fabric comprises a shared memory switch fabric.

16. The system of claim 13, wherein the jitter threshold level is not more than a maximum transmission unit (MTU) size associated with the output data buffer and the second jitter threshold level is not more than a MTU size associated with the second output data buffer.

17. The system of claim 13, comprising:
a processor to receive a header portion from the output data buffer or the second output data buffer, wherein the processor is to attempt to process a header of a first packet during streaming out of a body of a second packet.

18. A method comprising:
in a switch comprising a switch fabric and a memory to store a buffer:
adjusting a jitter threshold level based at least in part on a load on the switch fabric and
applying the jitter threshold level for the buffer, wherein the jitter threshold level indicates when egress of a packet segment from the buffer is permitted.

19. The method of claim 18, wherein the switch fabric comprises a shared memory switch fabric.

20. The method of claim 18, wherein the jitter threshold level indicates a number of segments for the buffer's head of line (HOL) packet that are to be in the buffer and/or indicates a timer that is based on a time of issuance of a first read request for a first segment of the packet in the buffer.

21. The method of claim 18, comprising:
processing a header of a first packet during streaming out of a body of a second packet.

* * * * *